(12) United States Patent
Sumioka

(10) Patent No.: US 8,764,201 B2
(45) Date of Patent: Jul. 1, 2014

(54) VIBRATION MEMBER DRIVING CIRCUIT

(75) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/357,489

(22) Filed: Jan. 24, 2012

(65) Prior Publication Data

US 2012/0194910 A1 Aug. 2, 2012

(30) Foreign Application Priority Data

Jan. 28, 2011 (JP) ................................. 2011-016348

(51) Int. Cl.
*G02B 1/00* (2006.01)
(52) U.S. Cl.
USPC ........................................................ 359/507
(58) Field of Classification Search
CPC .................................................. G02B 27/0006
USPC ............................ 359/507; 318/116, 126, 318
See application file for complete search history.

(56) References Cited

U.S. PATENT DOCUMENTS

| 4,632,311 A | 12/1986 | Nakane et al. | |
|---|---|---|---|
| 5,859,489 A * | 1/1999 | Shimada | 310/318 |
| 8,552,619 B2 | 10/2013 | Sumioka et al. | |
| 2009/0207493 A1 | 8/2009 | Ohashi | |
| 2010/0091121 A1 | 4/2010 | Kawai | |

FOREIGN PATENT DOCUMENTS

| CN | 101542889 A | 9/2009 |
|---|---|---|
| JP | 61-076078 A | 4/1986 |
| JP | 8-107687 A | 4/1996 |
| JP | 2005-286839 A1 | 10/2005 |
| JP | 2008-207170 A | 9/2008 |
| KR | 10-2009-0094301 A | 9/2009 |

* cited by examiner

*Primary Examiner* — Euncha Cherry

(74) *Attorney, Agent, or Firm* — Canon USA, Inc. IP Division

(57) ABSTRACT

A vibration member driving circuit causes vibrations in a vibration member at least including an electro-mechanical energy conversion element and an elastic body by applying alternating voltage to the electro-mechanical energy conversion element fixed to the elastic body. The vibration member driving circuit includes an inductor and capacitor serially connected to the electro-mechanical energy conversion element. $0.73*fm < fs < 1.2*fm$ is satisfied where fs is the series resonance frequency by the inductor and the capacitor and fm is the resonance frequency of the vibration member.

22 Claims, 18 Drawing Sheets

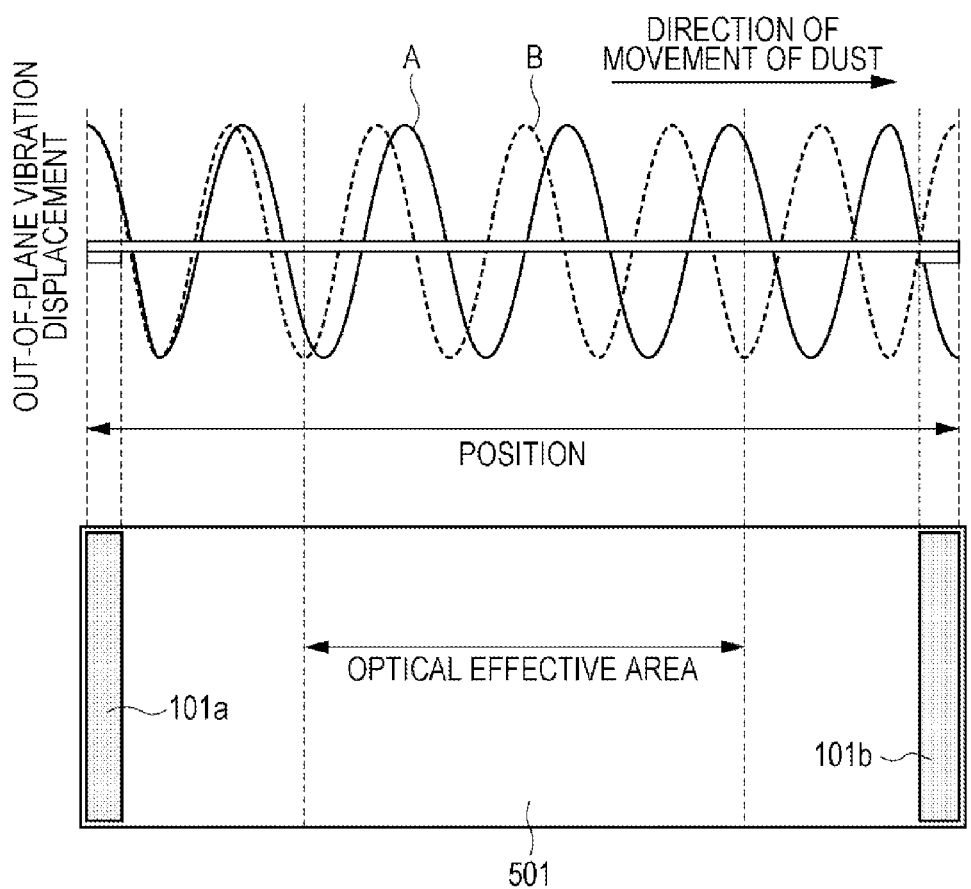

VIBRATION MEMBER DRIVING CIRCUIT

BACKGROUND OF THE INVENTION

1. Field of the Invention

Embodiments of the present invention relate to vibration member driving circuits.

2. Description of the Related Art

In recent years, with improved resolutions of image pickup elements, dust adhered to an optical system in use have affected captured images in image pickup apparatuses as optical apparatuses. Particularly, the resolutions of image pickup elements to be used in video cameras and still cameras have significantly been improved. For that, when external dust and/or dust (powder) such as wear debris caused on an internal mechanical rubbing surface are adhered to an optical member such as an infrared cut filter and an optical low pass filter near an image pickup element, the powder may appear on captured images because of less blurred images on an image pickup element surface.

An image pickup unit of a copy machine or facsimile machine as an optical apparatus scans a line sensor or scans a document placed closer to a line sensor to read a flat document. In this case, when dust adheres to a light beam launching area, the dust appears on a scanned image. One piece of dust may appear as a line image which continues in a document feeding direction and deteriorates the quality of the image in a reading unit of a facsimile machine which scans and reads a document or a reading unit of a copy machine which reads, that is, skims a document during transport from an automatic document feeder.

Japanese Patent Laid-Open No. 2008-207170 proposes a dust removing device which may move such dust in a desirable direction by exciting free traveling waves to a vibration member including an optical member. FIG. 3 is a schematic diagram illustrating a configuration of a dust removing device disclosed in Japanese Patent Laid-Open No. 2008-207170. A vibration member 501 having an optical member 502 is provided on a light entrance side of an image pickup element 503. Piezoelectric elements 101*a* and 101*b* which are electro-mechanical energy conversion elements are placed at different positions in the direction where nodal lines of out-of-plane bending vibration are aligned in the vibration member 501. Alternating voltages having an equal frequency and a phase difference of 90° are applied to the piezoelectric elements 101*a* and 101*b*.

The frequency of the alternating voltage to be applied is between a resonance frequency in an m-order (where m is a natural number) vibration mode which bends out of plane along the longitudinal direction of the vibration member 501 and a resonance frequency in an (m+1)-order vibration mode. In the vibration member 501, vibrations in the m-order vibration mode with a response with a resonance phenomenon and vibrations in the (m+1)-order vibration mode with a 90° time phase difference (phase advanced by 90° from the m-order out-of-plane bending vibration) are excited with an equal amplitude and at equal vibration periods. Then, in the vibration member 501, synthesized vibrations (free-traveling waves) are generated in which the vibrations in two vibration modes are synthesized. The synthesized vibrations move the dust on the surface of the vibration member 501 in a desirable direction.

However, in a dust removing device in the past, the amplitude change of alternating voltage to be applied to the piezoelectric element 101, that is, the gradient of a frequency characteristic of the alternating voltage may increase near the resonance frequency of the vibration member 501 in some frequency band to be used. For that reason, the alternating voltage largely changes when the resonance frequency of the vibration member 501 varies because of individual differences or the heat while the device is being driven changes the resonance frequency. The alternating voltage increased more than necessary may increase the power consumption because of a current increase or damage the optical member 501 because of the increase of the vibration amplitude excited in the vibration member 501. When the alternating voltage is lower than necessary voltage, a sufficient vibration amplitude of the out-of-plane bending vibration to be excited in the vibration member 501 may not be acquired, and the dust removal efficiency may decrease.

SUMMARY OF THE INVENTION

One disclosed aspect of the embodiments provides a driving circuit which outputs a stable voltage amplitude in a used frequency band with a small change in alternating voltage to be applied to an electro-mechanical energy conversion element even when the resonance frequency of a vibration member varies or changes during the device is being driven.

A vibration member driving circuit of one embodiment which causes vibrations in a vibration member at least including an electro-mechanical energy conversion element and an elastic body by applying alternating voltage to the electro-mechanical energy conversion element fixed to the elastic body includes an inductor and capacitor serially connected to the electro-mechanical energy conversion element, wherein $0.73*fm<fs<1.2*fm$ is satisfied where fs is the series resonance frequency by the inductor and the capacitor and fm is the resonance frequency of the vibration member.

According to the one disclosed aspect of the embodiments, a driving circuit may be provided which outputs a stable voltage amplitude in a used frequency band with a small change in alternating voltage to be applied to an electro-mechanical energy conversion element even when the resonance frequency of a vibration member varies or changes during the device is being driven.

Further features of the embodiments will become apparent from the following description of exemplary embodiments with reference to the attached drawings.

BRIEF DESCRIPTION OF THE DRAWINGS

FIG. 7 illustrates the displacement of order 10 out-of-plane bending vibrations and the displacement of order 11 out-of-plane bending vibrations which are excited in the vibration member and bend out of plane along the longitudinal direction and illustrating the arrangement of the piezoelectric elements.

DESCRIPTION OF THE EMBODIMENTS

Embodiments of a vibration member driving circuit to which the present invention is applicable will be described with reference to drawings. A vibration member driving circuit of one embodiment may drive an object such as powder by vibrating a vibration member. One embodiment is applicable if a vibration member is vibrated to drive an object such as powder on the vibration member though a dust removing device for removing dust which is powder and a driving circuit therefor will be described according to embodiments below. According to the embodiments, powder refers to an 1 µm or larger to 100 µm or smaller object.

Apparatuses having a vibration member and/or a driving circuit therefor of the embodiments may include optical apparatuses such as a camera (image pickup device), a facsimile machine, a scanner, a projector, a copy machine, and a printer. A vibration member and/or a driving circuit therefor of the embodiments are provided in an image pickup apparatus in embodiments below, for example. According to one disclosed aspect of the embodiments, an image pickup element such as a CCD and a CMOS sensor or a line sensor used in a copier or a facsimile machine, which is a photoelectric conversion element, is called a light receiving element.

First Embodiment

According to a first embodiment, a dust removing device which excites traveling waves in a vibration member to move dust which is powder is mounted in a camera.

(Configuration of Camera Body)

Figure 2A:
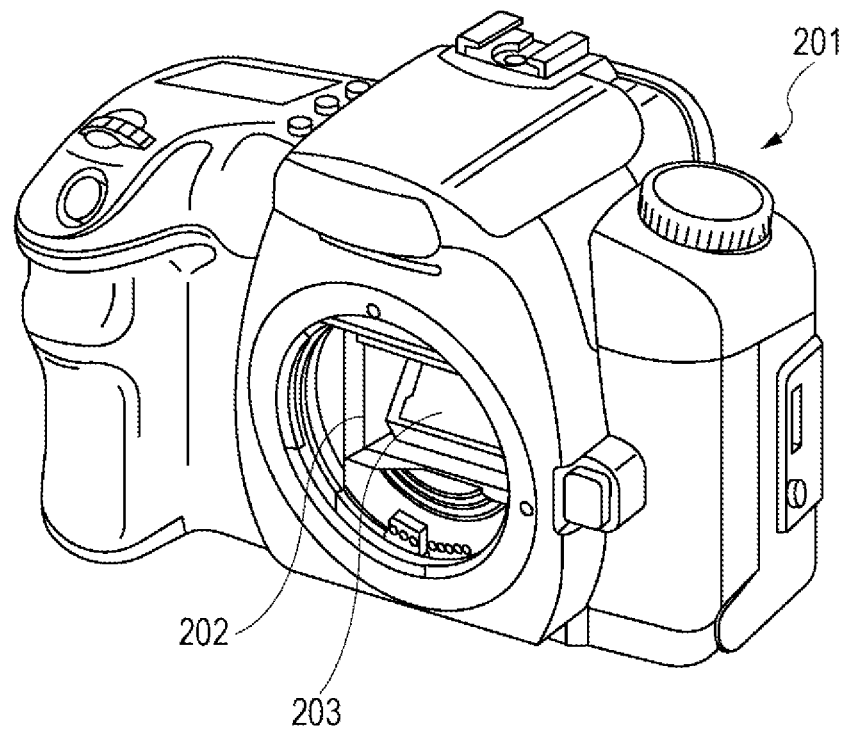
FIGS. 2A and 2B are perspective view of an image pickup apparatus to which one embodiment is applicable.
Figure 2B:
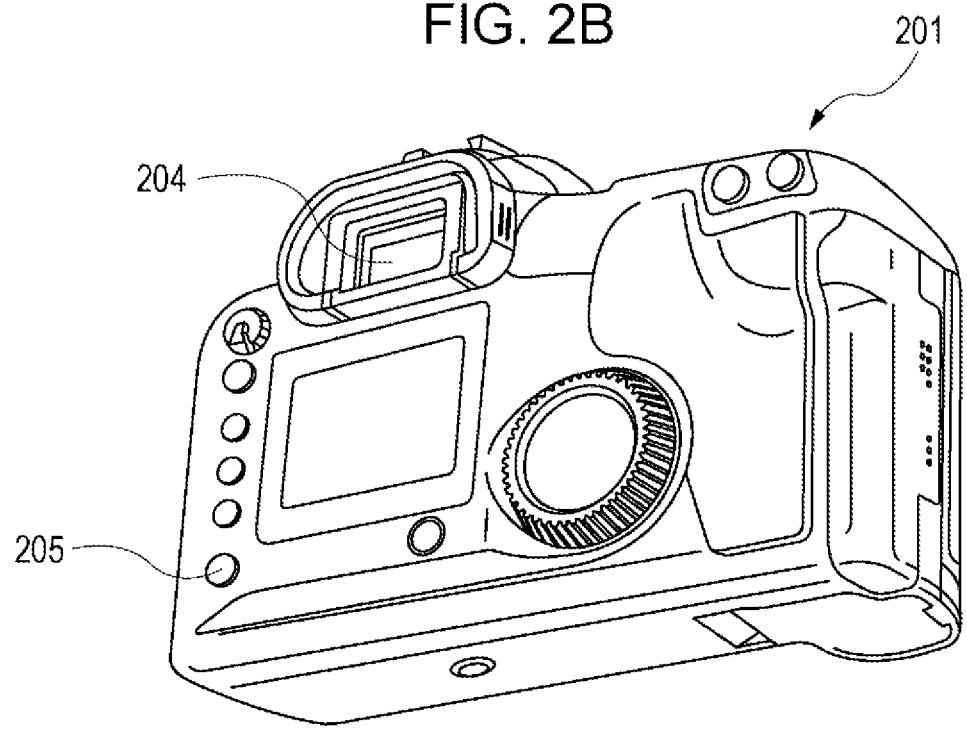

FIG. 2A is a front perspective view, from the subject side, of a digital single-lens reflex camera which is an image pickup apparatus according to the first embodiment and illustrates a state without an imaging lens. FIG. 2B is a back perspective view of the camera from a photographer. Within a camera body 201, a mirror box 202 is provided to which a imaging luminous flux passed through an imaging lens, not illustrated, is guided. A main mirror (quick return mirror) 203 is provided within the mirror box 202. An image pickup unit having the dust removing device is provided on an imaging optical axis passed through the imaging lens, not illustrated. The main mirror 203 may be held at an angle of 45° about an imaging optical axis so that a photographer may observe a subject image through a finder eye window 204 or may be held at a position avoiding an imaging luminous flux for guiding toward the image pickup element. A cleaning instruction switch 205 is provided on the back of the camera and may be used for driving a vibration member which is the dust removing device. If a photographer presses the cleaning instruction switch 205, an instruction unit 604 (refer to FIG. 4) is instructed to drive the dust removing device.

(Configuration of Dust Removing Device)

Figure 3:
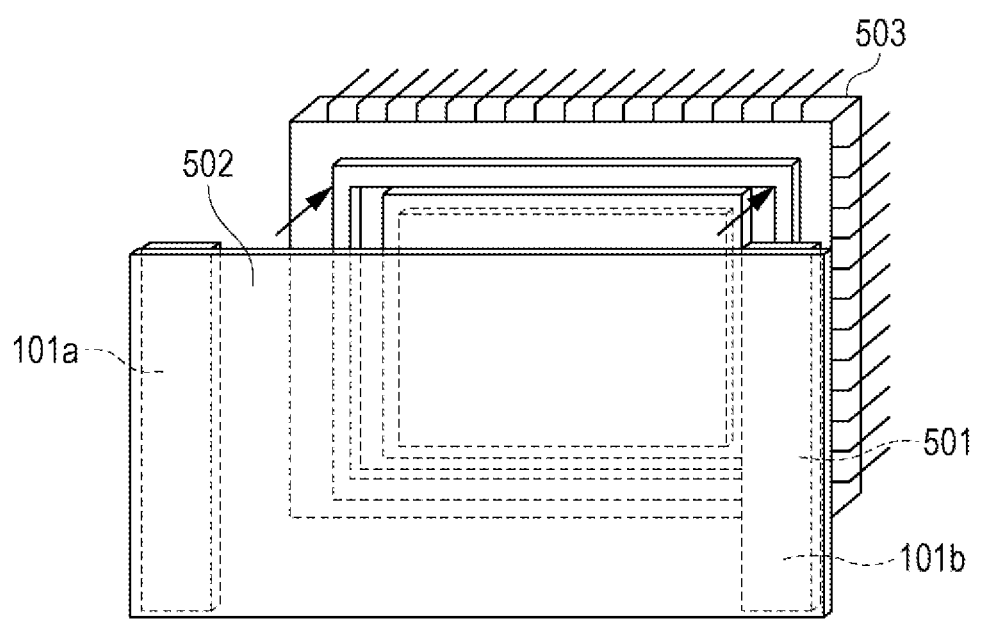
FIG. 3 is a perspective view illustrating a structure of an image pickup unit of a camera body having a dust removing device.

FIG. 3 is a perspective view illustrating a structure of an image pickup unit of the camera body 201 having a dust removing device that is a vibration member. An image pickup element 503 is provided in the image pickup unit of the camera body 201. The image pickup element 503 is a light receiving element such as a CCD and a CMOS sensor which converts a received subject image to an electric signal. A vibration member 501 is attached so as to tightly seal the space on the front surface of the image pickup element 503. The vibration member 501 at least includes a rectangular planer optical member 502 which is an elastic body and a pair of piezoelectric element 101a (first electro-mechanical energy conversion element) and a piezoelectric element 101b (second electro-mechanical energy conversion element) which are electro-mechanical energy conversion elements adhered to both ends of the optical member 502. The optical member 502 is an optical member with a high transmittance such as a cover glass, infrared cut filter, or an optical low pass filter. Light passing through the optical member 502 enters to the image pickup element 503.

The dimension in the thickness direction (vertical direction in the drawing) of the piezoelectric elements 101a and 101b at both ends of the optical member 502 is equal to the dimension in the thickness direction (vertical direction in the drawing) of the optical member 502 so as to increase the generative force of the bending deformation against vibrations. The piezoelectric elements 101a and 101b will simply be called piezoelectric elements 101 when no distinction is particularly required.

(Configuration of Control Device)

Figure 4:
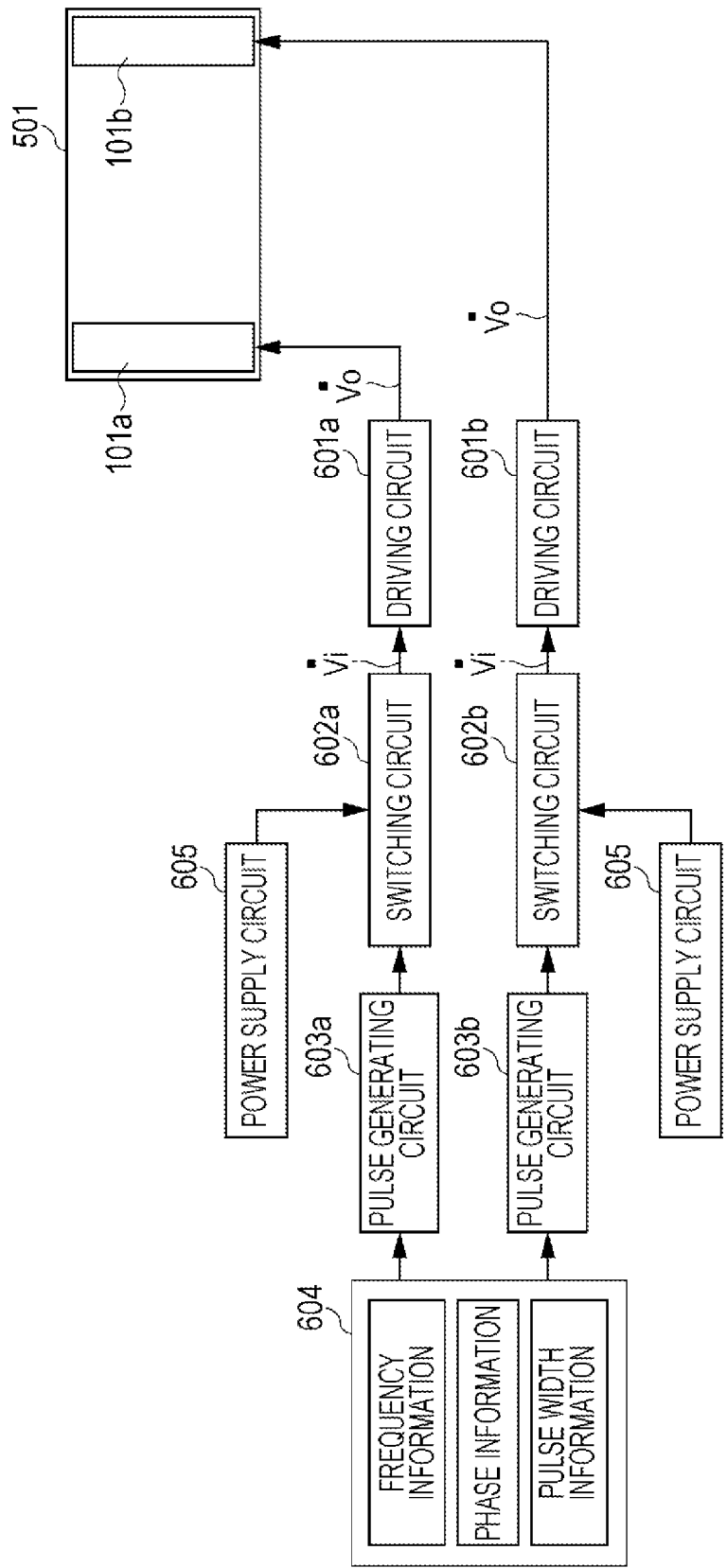
FIG. 4 illustrates a control apparatus for the dust removing device to which one embodiment is applicable.

FIG. 4 illustrates a control apparatus for the dust removing device. The control apparatus includes the instruction unit 604, pulse generating circuits 603a and 603b, switching circuits 602a and 602b, a power supply circuit 605, and driving circuits 601a and 601b. From the instruction unit 604, frequency information, phase information, and pulse width information which are parameters of an alternating voltage signal, are transmitted to the pulse generating circuits 603a and 603b. The pulse generating circuit may generally be digital oscillators, for example. The frequency is set in the vicinity of an intermediate value of the resonance frequency of vibrations (out-of-plane bending vibrations) in two vibration modes generated in the vibration member 501, and equal frequencies are set to the pulse generating circuits 603a and 603b. The vibration modes will be described below with reference to FIG. 7. Different values of phases from each other are input to the pulse generating circuits 603a and 603b and are set such that a different phase difference of the alternating voltage signals may be output (such as phase difference of 90°). The pulse width (pulse duty) is adjusted properly to acquire a desirable voltage amplitude and is separately set to the pulse generating circuits 603a and 603b.

The digital alternating voltage signal output from the pulse generating circuit 603 is input to the switching circuits 602a and 602b and is output as an analog alternating voltage Vi on the basis of the voltage supplied from the power supply circuit 605. The power supply circuit may be a general DC power supply circuit, DC-DC converter circuit or the like. The switching circuit may be a general H-bridge circuit.

The alternating voltage Vi is input to the driving circuits 601a and 601b and is output as an alternating voltage Vo after its voltage amplitude is raised and is converted to an SIN waveform. The output alternating voltage Vo is applied to the piezoelectric elements 101a and 101b, and two out-of-plane bending vibrations simultaneously occur in the vibration member 501. The synthesized vibrations become traveling waves and may move dust on the surface of the optical member 502 in a desirable direction. The configuration of the driving circuits 601a and 601b, which is a characteristic of the embodiments, will be described below with reference to FIG. 1.

The digital alternating voltage signal output from the pulse generating circuit 603 is input to the switching circuits 602a and 602b and is output as an analog alternating voltage Vi on the basis of voltage supplied from the power supply circuit 605. The power supply circuit may be a general DC power supply circuit, DC-DC converter circuit or the like. The switching circuit may be a general H bridge circuit.

The alternating voltage Vi is input to the driving circuits 601a and 601b and is output as an alternating voltage Vo after its voltage amplitude is raised and is converted to an SIN waveform. The alternating voltage Vo is applied to the piezoelectric elements 101a and 101b, and two out-of-plane bending vibrations simultaneously occur in the vibration member 501. The synthesized vibrations become traveling waves and may move dust on the surface of the optical member 502 in a desirable direction.

(Setting of Drive Frequency)

Figure 6A:
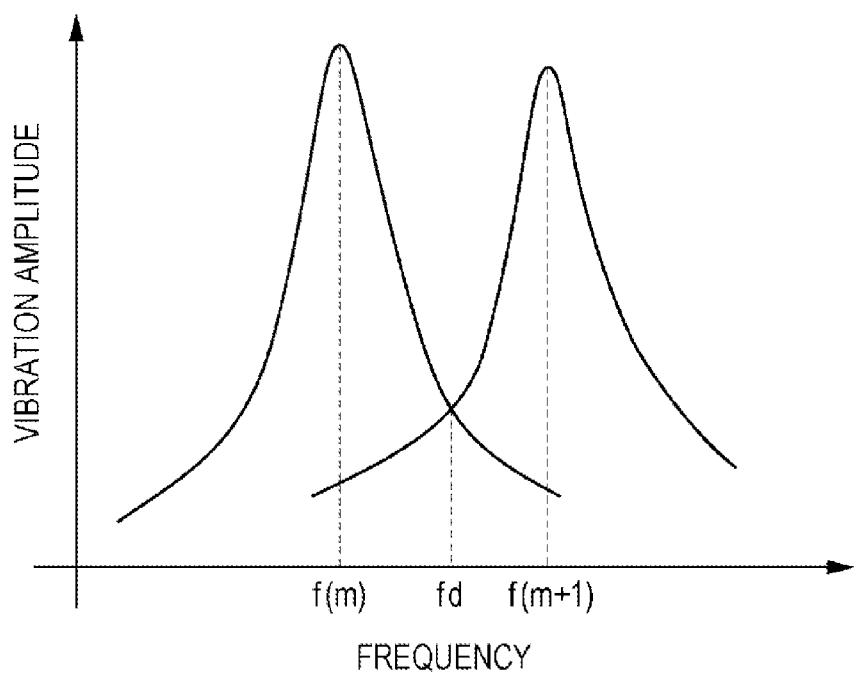
FIGS. 6A and 6B are graphs illustrating the frequencies of alternating voltages applied to piezoelectric elements, the amplitude of vibrations occurring in the piezoelectric elements, and their waveforms according to the first embodiment.

Setting of the drive frequency will be described next. FIG. 6A is a graph illustrating the frequencies of alternating voltages applied to the piezoelectric elements 101 and the amplitude of vibrations occurring in the piezoelectric elements 101. In FIG. 6A, f(m) is a resonance frequency of m-order out-of-plane bending vibrations, and f(m+1) is a resonance frequency of (m+1)-order out-of-plane bending vibrations. If a frequency fd of alternating voltage to be applied to the piezoelectric element 101 is set to f(m)<fd<f(m+1), vibrations at the frequency fd are acquired with an amplitude extended by the resonance phenomenon of the m-order out-of-plane bending vibrations and (m+1)-order out-of-plane bending vibrations. The time periods of the vibrations are equal. On the other hand, as the frequency fd of the alternating voltage to be applied to the piezoelectric element 101 is set lower than f(m), the amplitude of the (m+1)-order out-of-plane bending vibrations is lower. As the frequency fd is set higher than f(m+1), the amplitude of the m-order out-of-plane bending vibrations is lower.

(Description of Vibration Modes)

FIG. 7 is a schematic diagram illustrating the displacement of order 10 out-of-plane bending vibrations and the displacement of order 11 out-of-plane bending vibrations which are excited in the vibration member 501 and bend out of plane along the longitudinal direction and illustrating the arrangement of the piezoelectric elements 101a and 101b. The horizontal axis indicate the longitudinal position of the vibration member 501. The vertical axis indicates the out-of-plane vibration displacement. In FIG. 7, the order 10 out-of-plane bending vibration is indicated by a waveform A (solid line) as a first vibration mode, and the order 11 out-of-plane bending vibration is indicated by a waveform B (broken line) as a second vibration mode. The first vibration mode A and second vibration mode B are an out-of-plane bending vibration mode, which bending deforms the vibration member 501 in the thickness direction of the optical member 502.

When the driving circuits 601a and 601b apply the alternating voltage Vo to the piezoelectric elements 101a and 101b, the vibrations in the first vibration mode A and second vibration mode B thus simultaneously occur in the vibration member 501 and are superposed. According to this embodiment, the vibration modes minimum required for removing dust are the order 10 bending vibration mode as the first vibration mode and the order 11 bending vibration mode as the second vibration mode. However, the vibration modes are not limited thereto. The optical effective area corresponding to the image pickup element 503 is the range illustrated in FIG. 7. The deformed shape in the first vibration mode A has opposite phases (with a phase difference of 180°) at left and right ends. On the other hand, the deformed shape in the second vibration mode B is in phase between the left and right ends (with a phase difference of 0°). In other words, if the phase difference between alternating voltages to be applied to the piezoelectric element 101a and piezoelectric element 101b is set to 180°, the first vibration mode A only occurs. If the phase difference is set to 0° on the other hand, the second vibration mode B only occurs. Thus, if the phase difference is set to 90°, the first vibration mode A and second vibration mode B may be caused simultaneously, and the traveling waves from the synthesized vibrations may occur in the right direction of FIG. 7.

Figure 6B:
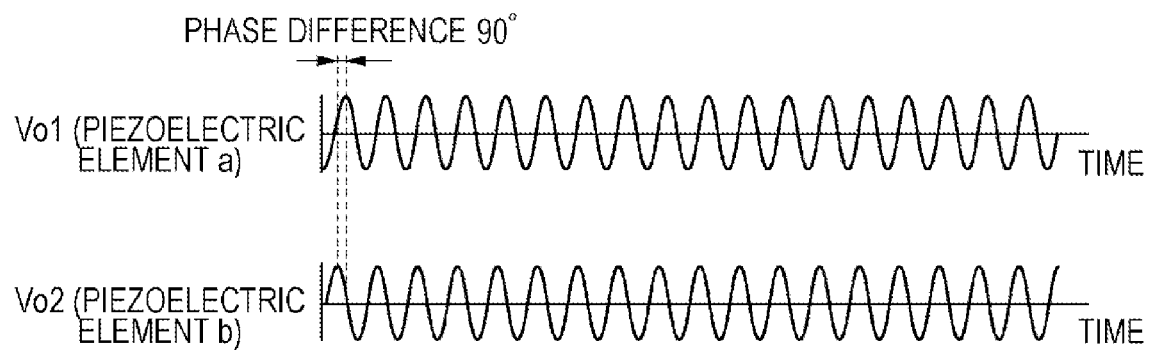

FIG. 6B illustrates examples of alternating voltages to be applied to the piezoelectric elements for simultaneously exciting vibration modes of different orders. The alternating voltage Vo 1 is a voltage waveform to be applied to the piezoelectric element 101a, and the alternating voltage Vo 2 is a voltage waveform to be applied to the piezoelectric element 101b. The vertical axis indicates voltage amplitude, and the horizontal axis indicates time. The frequency of the alternating voltages Vo 1 and Vo 2 is constant at fd described above, and the phase difference between the alternating voltages is 90°. However, the alternating voltages Vo 1 and Vo 2 may only be required to have different phases, and the phase difference is not limited to 90°.

In the dust removing device, the dust adhered to the surface of the optical member 502 moves as if it bounces off under the force in the normal direction of the surface of the optical member 502 when the optical member 502 pushes up the dust out of plane. In other words, when the speed of the synthesized vibration displacement of the vibration member 501 in phases of a drive frequency period is positive, the dust is pushed up out of plane, and the dust moves under the force in the normal direction of the synthesized vibration displacement in the phase. Referring to FIG. 7, by repeatedly applying vibrations to the dust adhered to the surface of the effective area of the optical member 502, the dust may be moved and removed in the right direction of FIG. 7.

(Description on Driving Circuit: LC Boost)

Figure 1A:
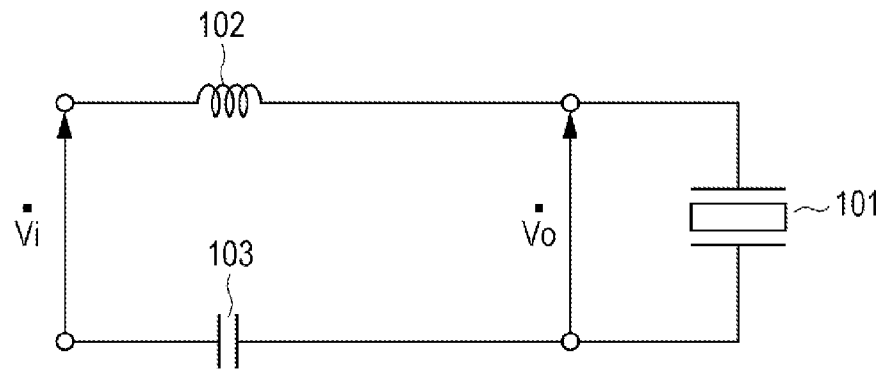
FIGS. 1A to 1C illustrate a vibration member driving circuit according to a first embodiment.
Figure 1B:
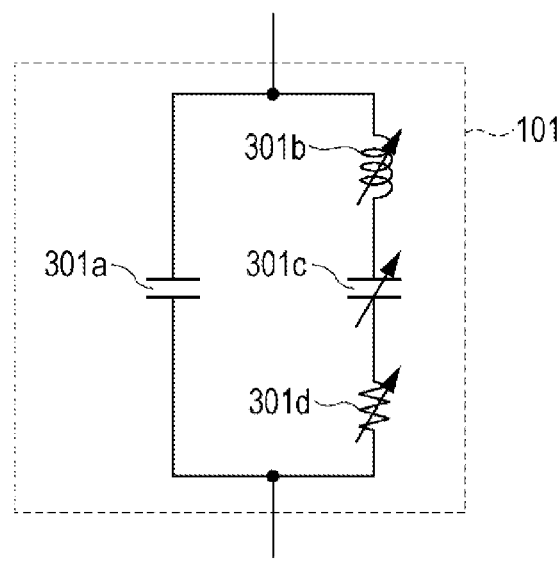
Figure 1C:
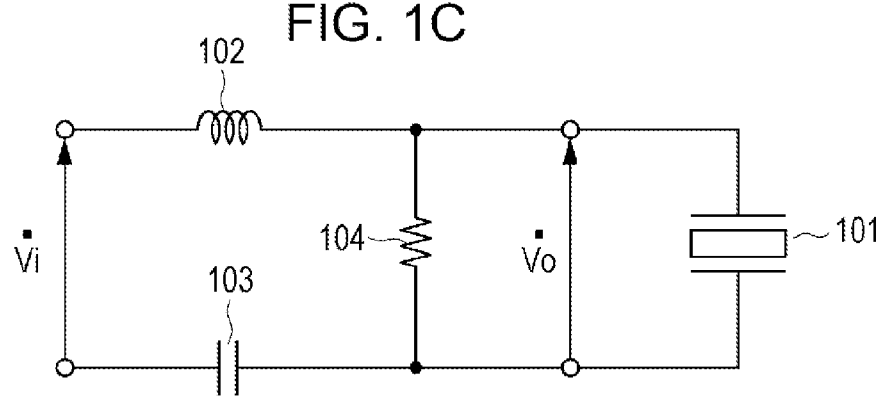

With reference to FIGS. 1A to 1C, a driving circuit of the first embodiment will be described. FIG. 1A illustrates a driving circuit for the dust removing device according to the first embodiment. The driving circuit includes an inductor 102 and a capacitor 103 which are serially connected to the piezoelectric element 101. Though the capacitor 103 is connected to the lower side of the piezoelectric element 101 in FIG. 1, it may be connected to the upper side (between the inductor 102 and the piezoelectric element 101). As illustrated in FIG. 1C, a resistance 104 may be connected in parallel with the piezoelectric element 101. The resistance 104 may be set to 1 MΩ with which current hardly flows to prevent power consumption in the resistance part. Providing the resistance 104 may define the potential at the connection point between the capacitor 103 and the piezoelectric element 101, stable alternating voltages may be applied across the piezoelectric elements.

The inductor 102 may be an inductance element such as a coil. The capacitor 103 may be a capacitance element such as a film capacitor. One disclosed aspect of the embodiments is characterized in that the series resonance frequency of the inductor 102 and the capacitor 103 is substantially matched with the resonance frequency of the vibration member 501 (set within a tolerance, which will be described below).

An equivalent circuit of the piezoelectric element 101 will be described with reference to FIG. 1B. FIG. 1B illustrates an equivalent circuit of the piezoelectric element 101. The equivalent circuit of the piezoelectric element 101 includes an RLC series circuits (equivalent coil 301b of self-inductance Lm, equivalent capacitor 301c of capacitance Cm, and equivalent resistance 301d of resistance value Rm) of the mechanical vibration part of the vibration member 501 and a capacitor 301a functioning as inherent capacitance Cd of the piezoelectric element 101 connected to the RLC series circuit in parallel.

According to the embodiments, the series resonance frequency by the inductor 102 and capacitor 103 is defined as fs, and the resonance frequency of the vibration member 501 is defined as fm. When the self-inductance of the inductor 102 is L and the capacitance of the capacitor 103 is C, $$fs = 1/(2\pi\sqrt{LC}) \quad (1\text{-}1)$$

$$fm = 1/(2\pi\sqrt{LmCm}) \quad (1\text{-}2)$$

The substantially matched fs and fm allows a gentle frequency characteristic of the alternating voltage Vo near fm.

Figure 5:
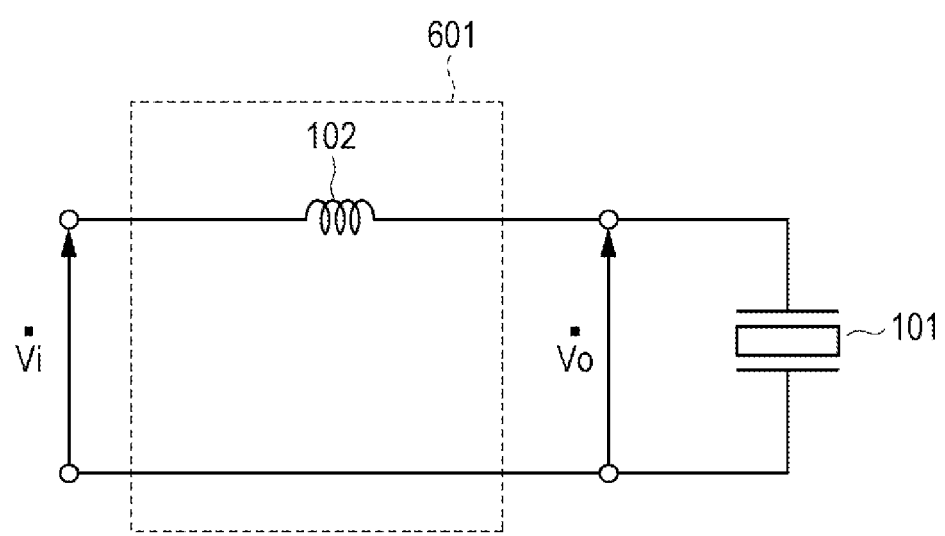
FIG. 5 illustrates a configuration of a driving circuit in the past.

With reference to FIG. 5, there will be described a configuration of a driving circuit in the past in which the inductor 102 is only connected to the piezoelectric element 101 in series. As illustrated in FIG. 5, serially connecting the inductor 102 to the piezoelectric element 101 may form an LC series resonance circuit by the inherent capacitance of the piezoelectric element 101 and the inductor 102. The voltage amplitude of the alternating voltage Vi is boosted to a desirable voltage by the LC series resonance circuit, and the alternating voltage Vo is output.

Figure 8:
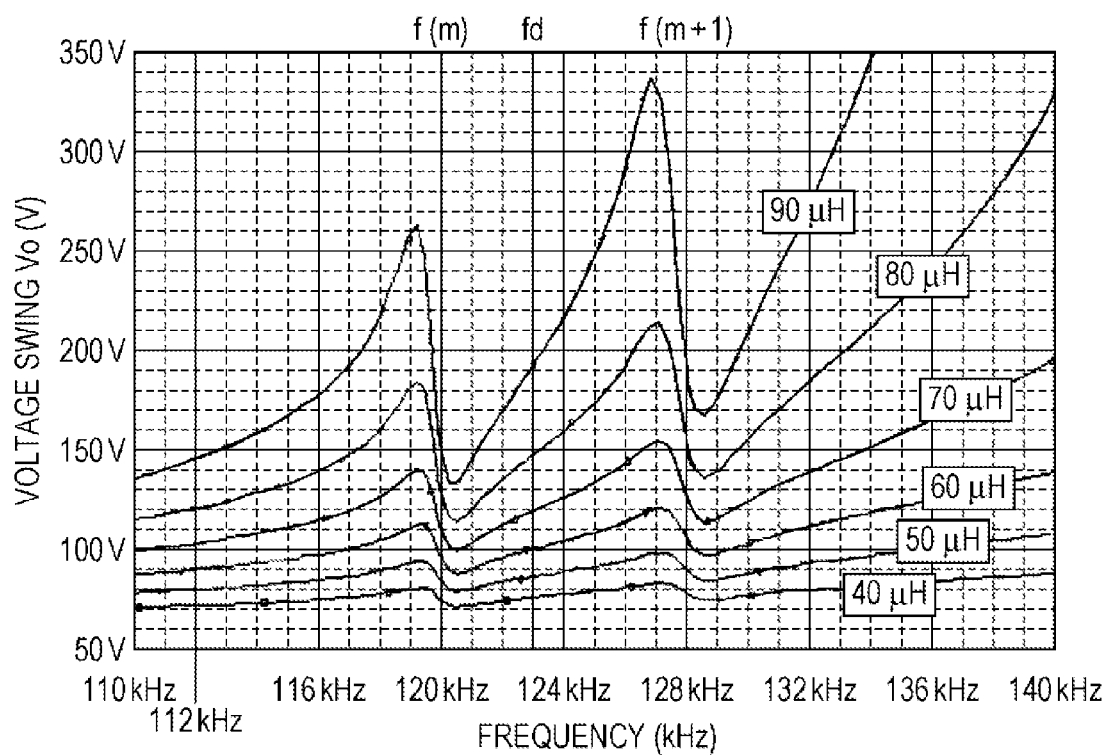
FIG. 8 illustrates a frequency characteristic of the voltage amplitude of the alternating voltage Vo when a driving circuit in the past is used.

FIG. 8 illustrates a frequency characteristic of the voltage amplitude of the alternating voltage Vo when a driving circuit in the past is used. The horizontal axis indicates frequency, and the vertical axis indicates voltage amplitude. The plots indicate a characteristic caused when the value of the inductor 102 is changed from 40 μH to 90 μH. In FIG. 8, f(m) is a resonance frequency of an m-order out-of-plane bending vibrations, and f(m+1) is a resonance frequency of an (m+1)-order out-of-plane bending vibrations. The frequency fd of the alternating voltage Vo to be applied to the piezoelectric element 101 is set to f(m)<fd<f(m+1). FIG. 8 illustrates that the amplitude change of the alternating voltage Vo occurs near fm and f(m+1). As the value of the inductor 102 increases, the change in voltage amplitude increases near fm, f(m+1) and fd. As the value of the inductor 102 decreases, the change in voltage amplitude decreases. However, a desirable voltage amplitude may not be acquired because of the decreasing voltage boost rate. As the value of the inductor 102 decreases, the electric resonance frequency fe of the LC series circuit shifts to a higher frequency. Thus, the harmonics component of the drive frequency fd is superposed over the fundamental harmonic, distorting the waveform. A large waveform distortion may excite unnecessary vibrations in the vibration member 501.

Like the example in the past, the reason why the amplitude change of the alternating voltage Vo occurs near fm or f(m+1) is because the self-inductance Lm and capacitance Cm of the mechanical vibration part of the vibration member 501 cause a change in impedance. On the other hand, according to the embodiments, fs and fm are substantially matched for impedance matching in the mechanical vibration part of the vibration member 501. As a result, the amplitude change of the alternating voltage Vo may be reduced. Moreover, the gentle frequency characteristic of the alternating voltage Vo near fm may reduce the change in admittance (equivalent resistance 301d) and/or the change in alternating voltage Vo due to the variations in inductor 102 and capacitor 103. Because of the impedance matching of the mechanical vibration part of the vibration member 501, the frequency characteristic is hardly influenced by variations of elements near fm.

(Simulation Result: Comparison in Voltage Amplitude and Current Between the Embodiment and Example in the Past)

Figure 9A:
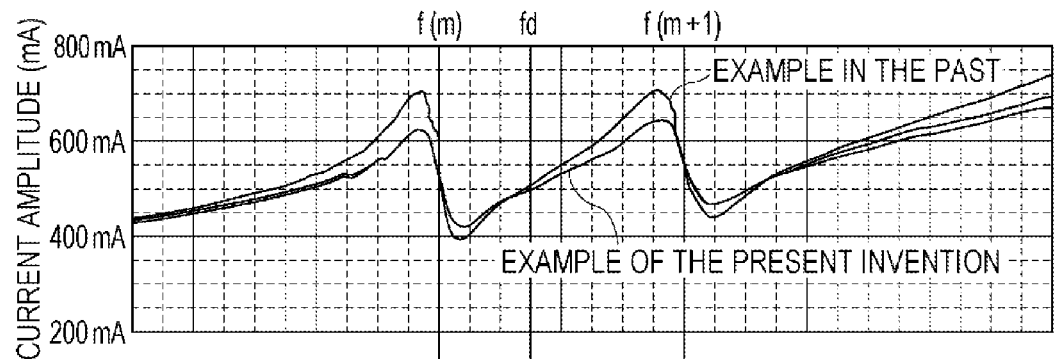
FIGS. 9A and 9B illustrate a simulation result describing frequency characteristics of a current amplitude and alternating voltages Vo when the series resonance frequency fs with the inductor and capacitor is substantially matched with the resonance frequency fm of the vibration member.
Figure 9B:
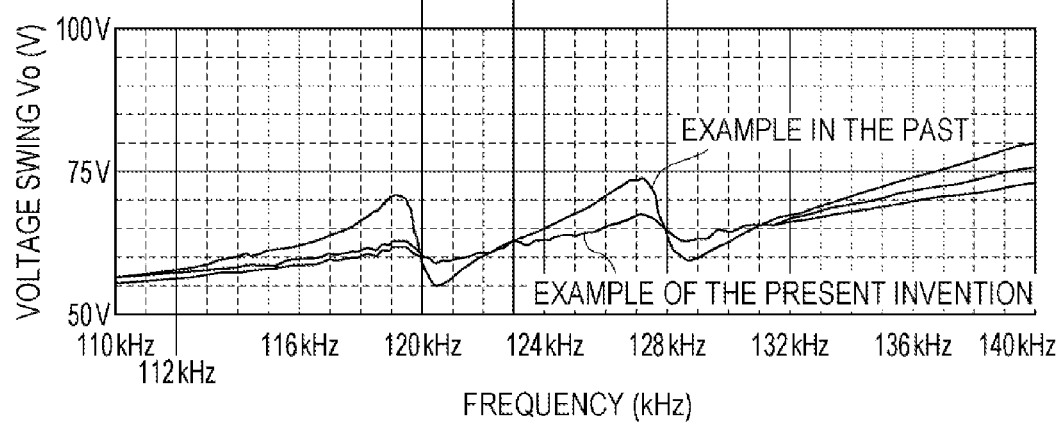

FIGS. 9A and 9B illustrate simulation results describing frequency characteristics of the alternating voltages Vo when the series resonance frequency fs with the inductor 102 and capacitor 103 is substantially matched with the resonance frequency fm of the vibration member 501. According to this embodiment, the driving circuit has the configuration in FIG. 1A. The vibration member 501 of this embodiment has two out-of-plane bending vibrations, and the resonance frequencies fm include two of f(m) and f(m+1). According to this embodiment, the series resonance frequency fs is set to fs=0.83*f(m) in accordance with the resonance frequency f(m). Ideally, fs and fm are completely matched. However, fs is set to a lower value than fm because raising the voltage boost rate of the voltage amplitude is difficult. On the basis of calculations, when fs is lower than fm, the voltage boost rate tends to increase. When fs is higher than fm, the voltage boost rate tends to decrease. Though the series resonance frequency fs is matched with f(m), the desirable effect may be acquired when it is a frequency near f(m+1).

In this simulation, the self-inductance Lm of the equivalent coil 301b was set to 0.04 H, and the capacitance Cm of the equivalent capacitor 301c was set to 44 pF. f(m) was set to 120 kHz, and f(m+1) was set to 128 kHz, and the drive frequency fd was set to 123 kHz. The self-inductance L of the inductor 102 was set to 82 μH, and the capacitance C of the capacitor 103 was set to 31 nF (fs=0.83*fm). Plots with the inductor 102 set to 68 μH and the capacitor 103 set to 42 n (fs=0.79*fm) are also illustrated though they are overlapped. An example in the past is also illustrated as a comparison example in which the inductor 102 was set to 68 μH when the configuration of the driving circuit in FIG. 5 is used.

(Stabilizing Voltage)

FIG. 9A illustrates a frequency characteristic of the current amplitude to be fed to the driving circuit. FIG. 9B illustrates a frequency characteristic of the voltage amplitude of the alternating voltage Vo. As illustrated in FIGS. 9A and 9B, substantially matching between fs and fm may provide a gentle frequency characteristic of the alternating voltage Vo near f(m) and f(m+1). In other words, stable voltage is applied to a change in resonance frequency of the vibration member 501, which may reduce changes in drive current. For example, when the resonance frequency f(m+1) decreases over time during driving, the amplitude of the alternating voltage increases and the drive current increases in the example in the past. According to one embodiment, the changes may be reduced.

The electric resonance by the inductor 102 and the capacitor 301a which is an inherent capacitance of the capacitor 103 and piezoelectric element 101 may be used to set the amplitude of the alternating voltage Vo to have a peak at a certain frequency. Defining the peak frequency of the alternating voltage Vo as fe and setting fe to a higher frequency than fm may provide a frequency characteristic with less voltage change even when the drive frequency fd of the vibration member 501 is changed in the frequency band from fm to fe. According to this embodiment, all of the peak frequencies fe were set to the range from 180 to 200 kHz.

(Reducing Influence of Admittance Change)

Figure 10A:
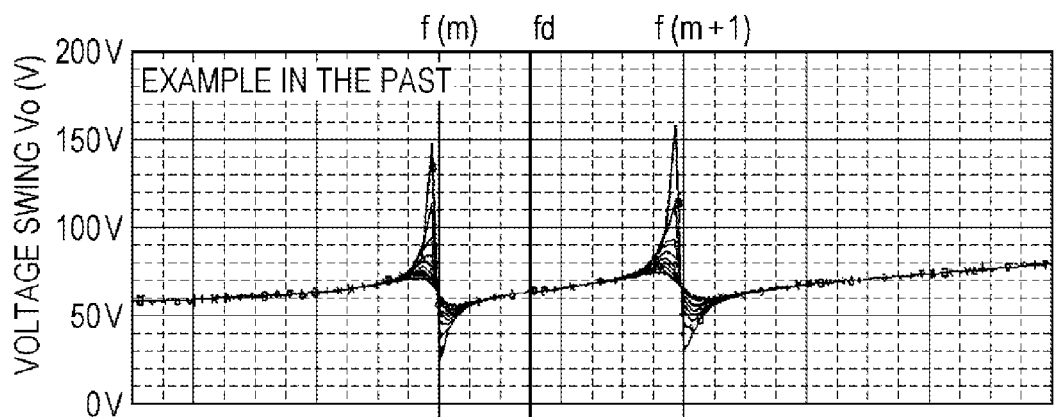
FIGS. 10A and 10B illustrate results of simulations by calculations of how the alternating voltages Vo change in accordance with the changes in admittance.
Figure 10B:
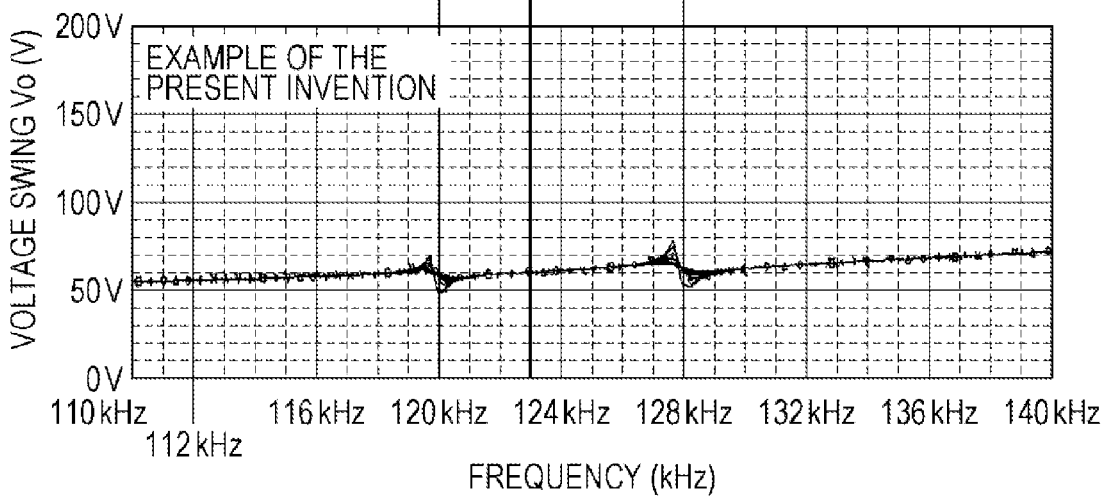

FIGS. 10A and 10B illustrate the effects of reduction of changes of the alternating voltage Vo. FIGS. 10A and 10B illustrate the results of simulations by calculations of how the alternating voltage Vo changes in accordance with the changes in admittance. The changes in admittance were calculated by changing the value of the equivalent resistance 301d from 10% to 100% of a reference value. As the equivalent resistance decreases, the admittance increases. FIG. 10A illustrates an example in the past, and FIG. 10B illustrates this embodiment. FIGS. 10A and 10B illustrate that this embodiment reduced the influence of a change in admittance to about 20% of that of the example in the past.

(Reducing Influence of Variations Due to L and C and Cd)

Figure 11A:
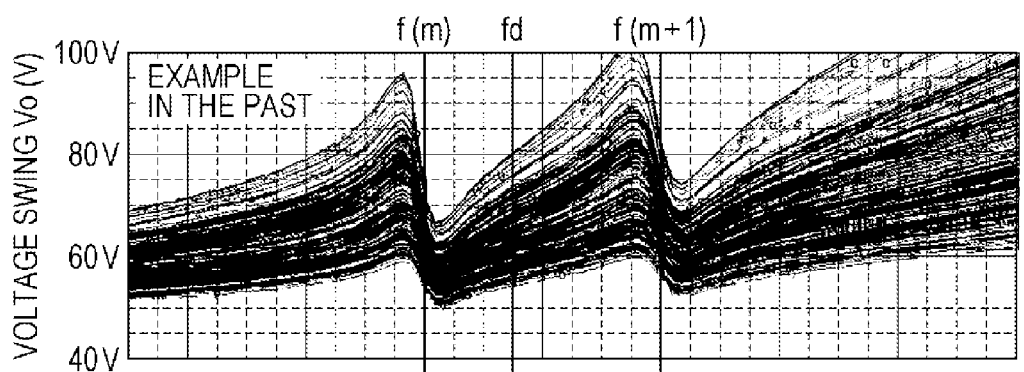
FIGS. 11A and 11B illustrate simulation results of how the alternating voltage Vo changes in accordance with the variations in the inductor, capacitor and the inherent capacitance of the piezoelectric element.
Figure 11B:
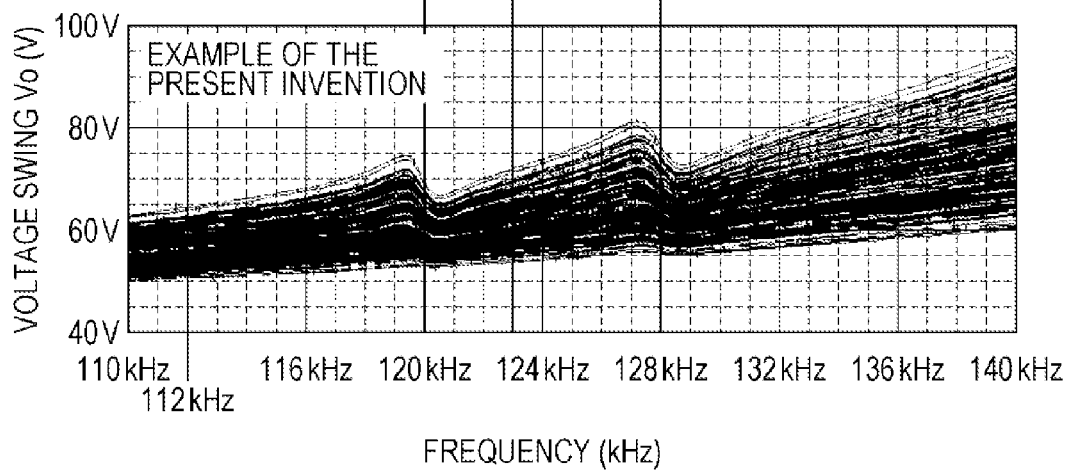

FIGS. 11A and 11B illustrate simulation results of how the alternating voltage Vo changes in accordance with the variations in the inductor 102, capacitor 103 and the inherent capacitance of the piezoelectric element 101. Random number calculation was performed on a uniform distribution by Monte Carlo method when the variation of the self-inductance L of the inductor 102 is ±20%, the variation of the capacitance C of the capacitor 103 is ±10%, and the variation of the capacitor 301a which is the inherent capacitance Cd of the piezoelectric element 101 is ±10%. FIG. 11A illustrates an example in the past, and FIG. 11B illustrates this embodiment. According to this embodiment, the influence of the variations of elements of the entire driving circuit including the piezoelectric element 101 is reduced to about 70% of that of the example in the past.

(Reducing Current Increase)

Figure 12:
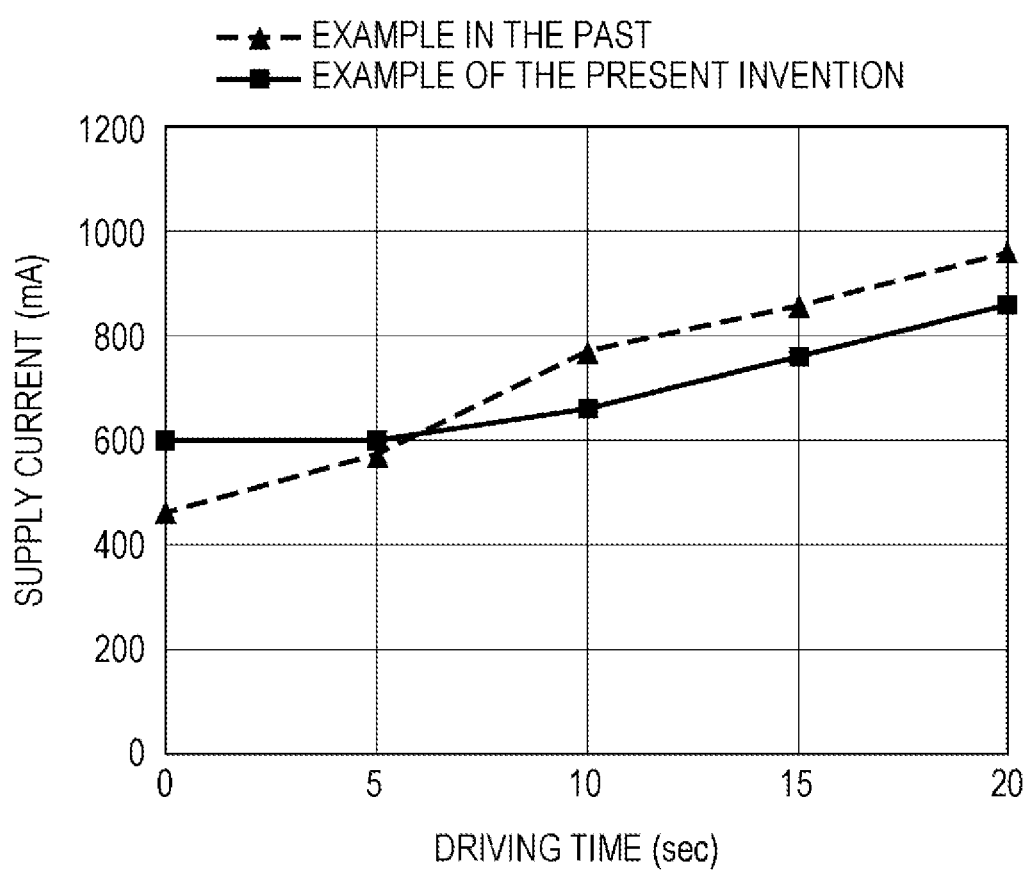
FIG. 12 illustrates results of measurement of changes in power supply current against driving time.

The vibration member 501 was actually driven by the driving circuit of this embodiment, and power supply currents are compared. FIG. 12 illustrates results of measurement of changes in power supply current against driving time. The power supply used was 12 VDC power supply. In a driving circuit of the example in the past, the power supply current increased about twice as the initial value after 20 seconds. In the driving circuit of this embodiment, the increase was about 40%. Thus, the power consumption may be reduced.

(Acceptable Range of Relationship Between fs and fm)

Next, there will be described the acceptable range of the relationship between the series resonance frequency fs by the inductor 102 and capacitor 103 serially connected to the piezoelectric element 101 and the resonance frequency fm of the vibration member 501 (the range of substantial match between fs and fm). According to this embodiment, fm and fs are completely matched. However, the embodiments are not limited to the case where fs and fm are completely matched.

In other words, fs and fm may be set to close values within a certain range for a gentle frequency characteristic of the alternating voltage Vo near fm. However, as the difference between fs and fm decreases, the effect increases.

Figure 14A:
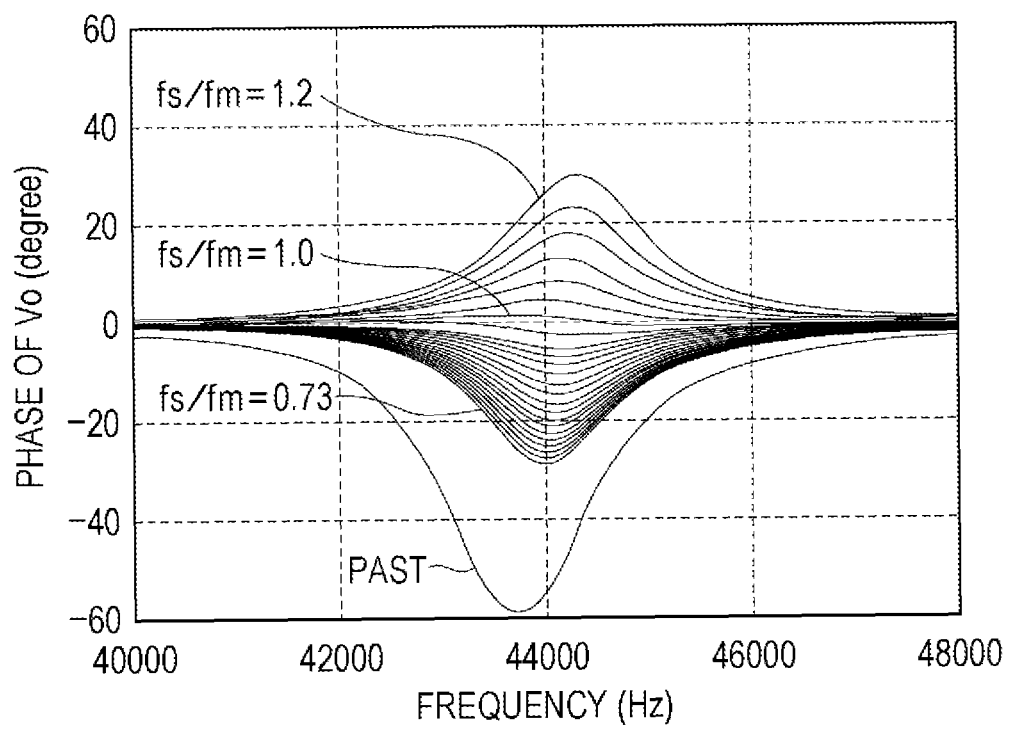
FIGS. 14A and 14B illustrate simulation results describing changes in phase and alternating voltage Vo, compared with the past, in accordance with changes in fs/fm.

According to the embodiments, in order to acquire the effective range of fs, the phase changes of the alternating voltage Vo near the resonance frequency fm of the piezoelectric element 101 were focused. FIG. 14A illustrates simulation results illustrating phases of the alternating voltage Vo. The horizontal axis indicates frequency. FIG. 14A illustrates changes in phase of Vo from 40 kHz to 48 kHz where the resonance frequency fm is 44.142 kHz. In this simulation, the driving circuit of FIG. 1A was used. The ratio of the series resonance frequency fs by the inductor 102 and capacitor 103 to fm (fs/fm) were changed in the range from 0.73 to 1.2, and the changed ratios were plotted.

Here, values of L and C were adjusted such that the peak frequency fe may be 61.798 kHz (=1.4*fm) at all times, and fs/fm was changed. The peak frequency fe was kept constant because the amplitude of Vo largely changes near the resonance frequency fm of the vibration member 501 in accordance with the value of fe. For a comparison reference configuration in the past, the circuit in FIG. 5 was used for the calculation, and the calculation results were plotted. The self-inductance L of the inductor 102 in this case was 1.97 mH, and the peak frequency fe of the alternating voltage Vo was set to 61.798 kHz (=1.4*fm).

FIG. 14A illustrates that Vo of the configuration of the example in the past has a phase delayed by up to 60°. On the other hand, if fs/fm=1, Vo hardly has phase changes. If fs/fm=1, the self-inductance L of the inductor 102 is 4.17 mH, and the capacitance C of the capacitor 103 is 3.12 nF. There is a tendency that the degree of satisfaction of fs/fm<1 increases, the change of phase to the negative side increases. As the degree of satisfaction of fs/fm>1 increases, the change of phase to the positive side increases.

Figure 14B:
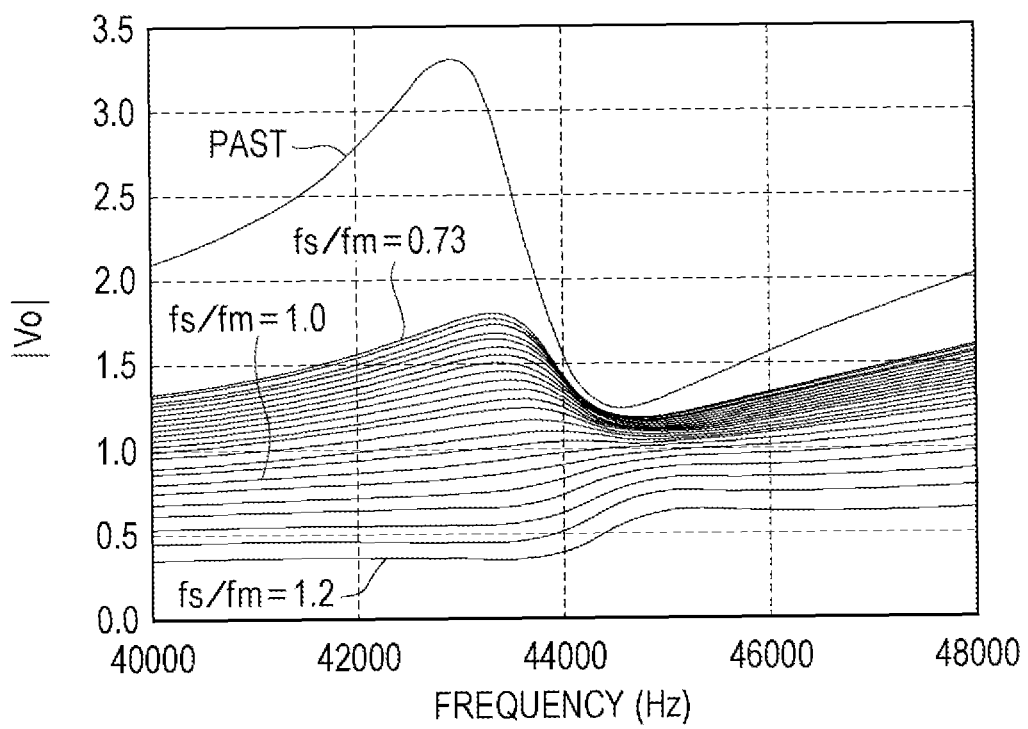

FIG. 14B illustrates the results of simulations describing the changes in alternating voltages Vo according to frequencies in order to check the relationship between phase changes of the alternating voltage Vo in FIG. 14A and the amplitude changes of the alternating voltage Vo. The simulation conditions are the same as those of FIG. 14A, and simulation results with fs/fm changed in the range from 0.73 to 1.2 and a configuration of the example in the past were compared and were plotted. The tendencies of the amounts of changes in phase illustrated in FIG. 14B and the amounts of changes in voltage illustrated in FIG. 14A correspond. In other words, as the change in phase of Vo increases, the change in amplitude of Vo increases.

Figure 15:
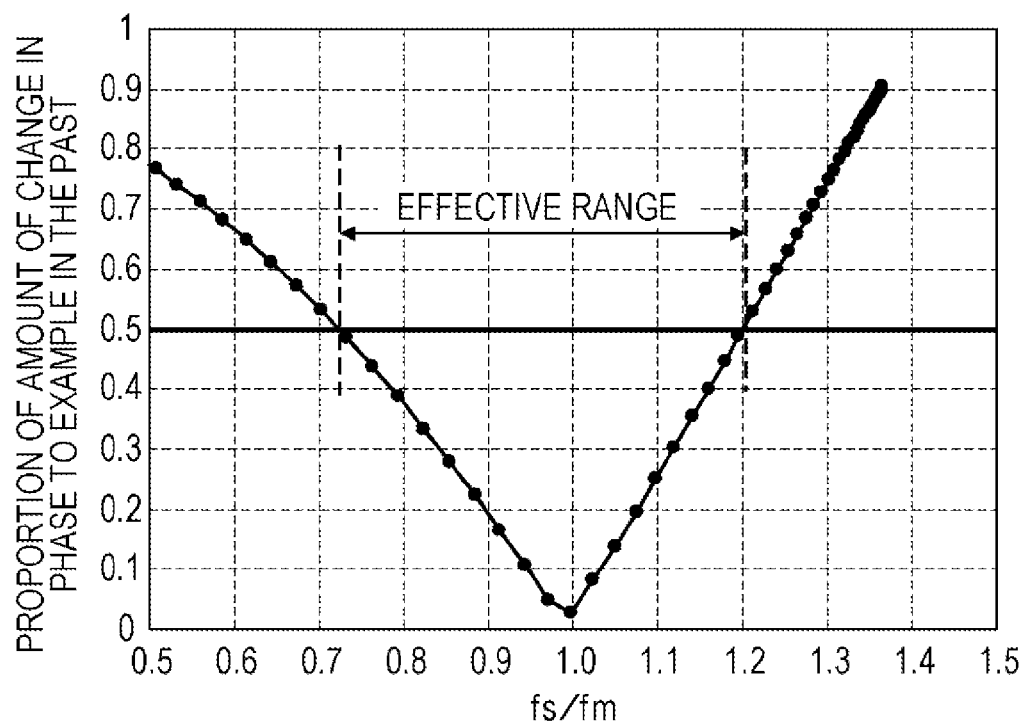
FIG. 15 illustrates simulation results of the proportion of the amounts of changes in phase to the configuration of the example in the past in accordance with changes in fs/fm.

FIG. 15 illustrates simulation results of the proportion of the amounts of changes in phase to the configuration of the example in the past in accordance with changes in fs/fm. The horizontal axis indicates fs/fm which is the ratio of fs to the resonance frequency fm of the vibration member 501. The vertical axis indicates the proportion of the amounts of changes in phase to the configuration of the example in the past and was calculates as follows. First, the absolute values of the amounts of changes in phase of Vo when the configuration of the example in the past was used in the range from 40 kHz to 48 kHz, and the maximum value was detected. This will be called "the maximum amount of change in phase of the configuration in the past". Next, on the basis of the configuration in FIG. 1A, the absolute values of the amounts of change in phase of Vo were calculated in the range from 40 kHz to 48 kHz by using fs/fm as a parameter, and the maximum value was detected. This will be called "the maximum amount of change according to fs/fm". The proportion of the amount of change in phase to the configuration of the example in the past may be expressed with a vertical axis acquired by calculating the ratio therebetween as:

"the maximum amount of change according to fs/fm "/" the maximum amount of change in phase of the configuration in the past".

According to the embodiments, as illustrated in FIG. 15, the condition that the proportion of the amount of change in phase is half of the configuration of the example in the past was defined as a threshold value, and the range was acquired where a gentle frequency characteristic of the alternating voltage Vo near fm may be acquired. As the result, the range where the effect of fs/fm may be acquired was:

0.73*fm<fs<1.2*fm

The range was calculated where the peak frequency fe was 61.798 kHz (=1.4*fm), the inherent capacitance Cd of the capacitor 301a of the piezoelectric element 101 was 3.5 nF. However, substantially equivalent calculate results may be acquired even when the values of the peak frequency fe and/or inherent capacitance Cd are changed. The range was also calculated where the self-inductance Lm of the equivalent coil 301b in the piezoelectric element 101 was 0.1 H, the capacitance Cm of the equivalent capacitor 301c was 130 pF, and the value of resistance Rm of the equivalent resistance 301d was 1 kΩ.

On the basis of the range, the amount of change in phase difference of the alternating voltages Vo may be reduced to the half or smaller so that the amount of change in Vo may substantially be reduced to the half or smaller, compared with the past. In other words, even without the complete match between fs and fm, the satisfaction of the aforementioned relationship between fs and fm may provide a gentler frequency characteristic of the alternating voltage Vo near fm than before.

(How to Determine the Values of Inductor 102 and Capacitor 103)

Next, how to determine the values of the inductor 102 and capacitor 103 will be described. Because the series resonance frequency fs depends on the product of the inductance L of the inductor 102 and the capacitance C of the capacitor 103, many combinations may define the same fs. On the other hand, the peak frequency fe of the alternating voltage Vo may be determined first to acquire one combination.

The peak frequency fe of Vo may be calculated from the inductance L of the inductor 102, the capacitance C of the capacitor 103, and the inherent capacitance Cd of the piezoelectric element 101. The peak frequency fe may be expressed by Expression 1-3:

$$fe = 1 \Big/ \left( 2\pi \sqrt{L \cdot \frac{C \cdot Cd'}{C + Cd'}} \right) \quad (1\text{-}3)$$

In order to calculate the actual peak frequency fe, the piezoelectric element 101 is equivalently regarded as a capacitor, and Cd' in consideration of an influence of the RLC series circuit of the mechanical vibration part is used. For example, when the influence of the RLC series circuit of the mechanical vibration part corresponds to a capacity change of 44 pF, Cd'=Cd−44 pF may be used for the calculation.

Figure 16:
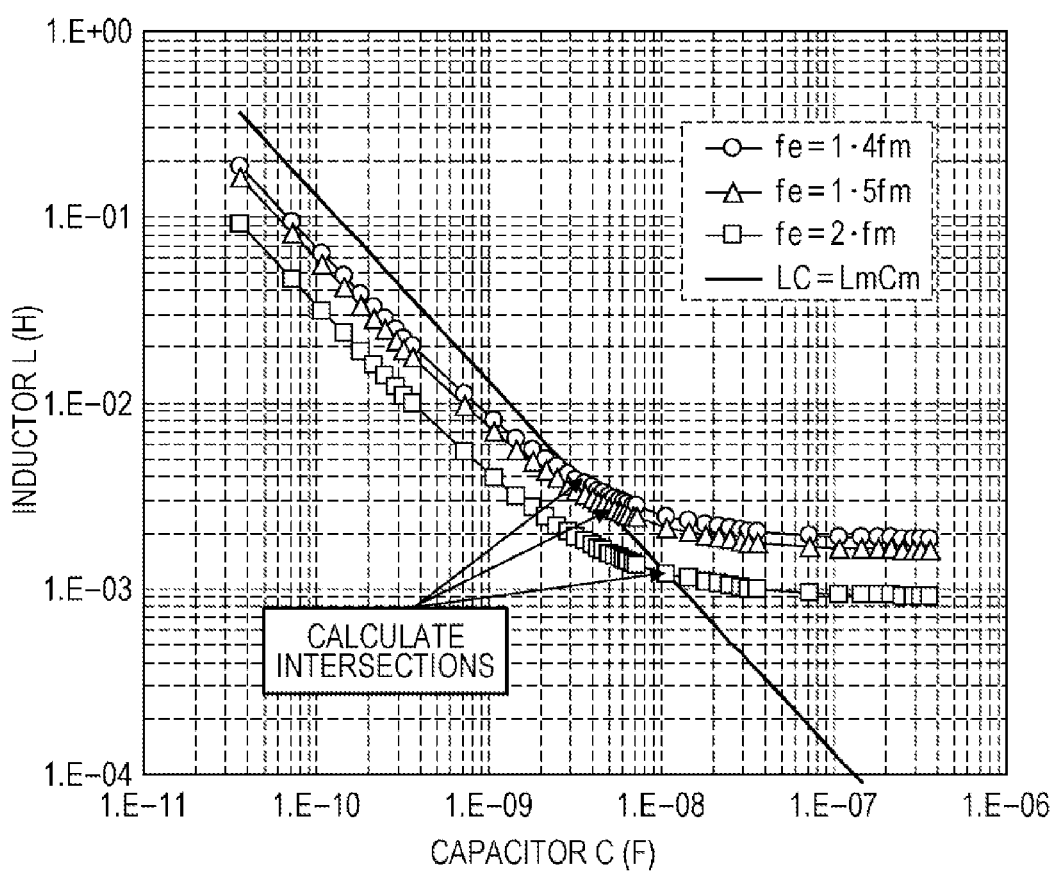
FIG. 16 illustrates a relationship between the inductance L of the inductor according to the peak frequency fe and the capacitance C of the capacitor.

The functions of L and C may be acquired by determining the value of fe from the expression of the peak frequency fe. FIG. 16 illustrates a relationship between the inductance L of the inductor 102 according to the peak frequency fe and the capacitance C of the capacitor 103. The horizontal axis indicates the value of C, and the vertical axis indicates the value of L. The values of L and C were plotted which were acquired from (Expression 1-3) where fe is 1.4*fm, 1.5*fm, and 2*fm. Plots are also illustrated when the product LC which of L and C is LmCm, that is, when the series resonance frequency fs is matched with fm. As described above, Lm indicates the self-inductance of the equivalent coil 301b, and Cm indicates the capacitance of the equivalent capacitor 301c.

Referring to FIG. 16, the functions of the inductor and capacitor when fe is fixed intersects with the function of LC=LmCm at one point. The point represents the optimum values of the inductance L and capacitance C where fs is matched with fm. For example, fe is 1.4*fm, L is 4.17 mH, and C is 3.12 nF.

Next, the value of fe will be described. According to the embodiments, the condition for the peak frequency fe is preferably set to satisfy the relationship:

fe<2*fd where the drive frequency of the vibration member 501 is fd. The reason will be described next.

Figure 13:
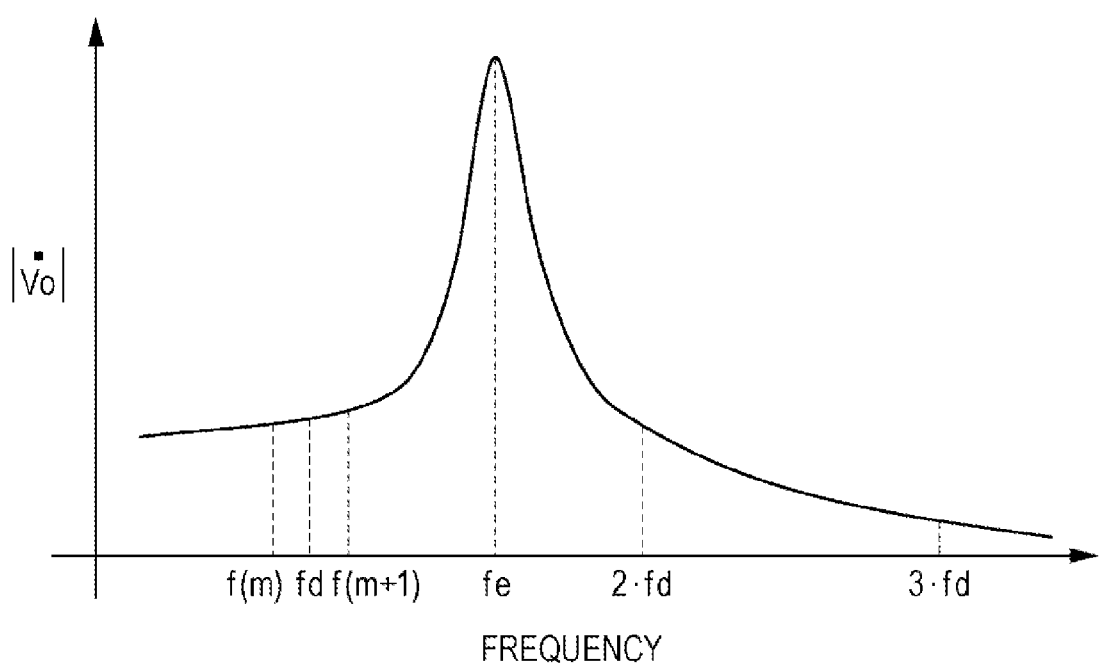
FIG. 13 illustrates the frequency characteristic of the alternating voltage Vo when the relationship fe<2*fd is satisfied.

FIG. 13 illustrates the frequency characteristic of the alternating voltage Vo when the relationship fe<2*fd is satisfied. 2*fd is the second harmonic frequency of the drive frequency fd. The waveform of the alternating voltage Vo is preferably be a SIN waveform having the second harmonic component and/or third harmonic component as small as possible. Because the drive waveform of the alternating voltage Vo in a real device is adjusted to have a pulse duty of 10% to 50%, the third harmonic component may particularly be required to reduce. The peak frequency fe may be set to a lower value than 2*fd to reduce the amplitude of the alternating voltage Vo of the frequency 2*fd of the third harmonic component lower than the drive frequency fd. For example, when the drive frequency fd is 46 kHz, 2*fd is 92 kHz. In this case, when the inductance L of the inductor 102 is set to 4 mH and the capacitance C of the capacitor 103 is set to 3.25 nF, the peak frequency fe is 61.3 kHz, which may satisfy the condition.

Second Embodiment

A second embodiment will be described next. This embodiment is different from the first embodiment in that a transformer is used to voltage boost. The configuration of a dust removing device which is the vibration member and the vibration modes are the same as those of the first embodiment, and a driving circuit will only be described below.

(Description of Driving Circuit/Transformer Voltage Boost)

Figure 17A:
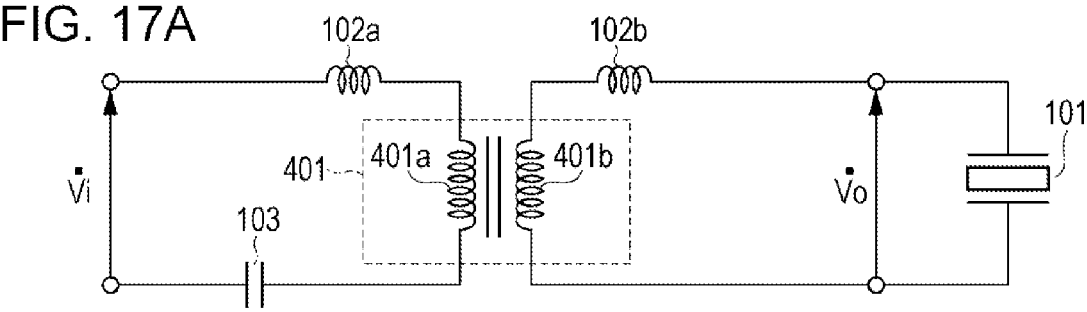
FIGS. 17A to 17E illustrate driving circuits for a dust removing device having a transformer according to a second embodiment.

FIG. 17A illustrates a driving circuit for a dust removing device according to the second embodiment. In the configuration of the driving circuit, a secondary coil 401b of a transformer 401 is connected to a piezoelectric element 101 in parallel. A capacitor 103 is serially connected to a transformer primary coil 401a of the transformer 401. The capacitor 103 may be a capacitance element such as a film capacitor. Weakening the coupling of the transformer 401 allows the use of a leakage inductance of the transformer primary coil 401a and a leakage inductance of the transformer secondary coil 401b as an inductor.

FIG. 17A equivalently illustrates the leakage inductances as the inductors 102a (leakage inductance of the transformer primary coil 401a) and 102b (leakage inductance of the transformer secondary coil 401b). The two leakage inductances and the capacitor 103 form series resonance. Though the capacitor 103 is connected to the lower side of the transformer primary coil 401a in FIG. 17A, it may be connected to the upper side (between the inductor 102a and the transformer primary coil 401a). The series resonance frequency by the leakage inductance 102a on the primary side, the leakage inductance 102b on the secondary side and the capacitor 103 is defined as fs, and the resonance frequency of the vibration member 501 is defined as fm may be expressed by Expressions 2-1 and 2-2.

$$fs=1/(2\pi\sqrt{\{L_1+(L_2/N^2)\}C})  \quad (2\text{-}1)$$

$$fm=1/(2\pi\sqrt{LmCm}) \quad (2\text{-}2)$$

where the leakage inductance 102a of the transformer primary coil 401a is L1, the leakage inductance 102b of the transformer secondary coil 401b is L2, the turns ratio of the secondary coil 401b to the primary coil 401a is N, and the capacitor 103 is C.

As described above, Lm and Cm are equivalent circuit constants of mechanical vibrations of the piezoelectric element 101. Lm is a self-inductance of the equivalent coil 301b, and Cm is a capacitance of the equivalent capacitor 301c.

Like the first embodiment, without complete match between the series resonance frequency fs and the resonance frequency fm of the vibration member 501, a gentle frequency characteristic of the alternating voltage Vo may be acquired near fm by setting fs to a value close to fm in the following range:

$$0.73*fm<fs<1.2*fm$$

In configurations using a transformer, the coefficient relating to LC in the computation expression of fs is different between the primary side and the secondary side of the transformer to which the inductor 102 and capacitor 103 are connected. The configurations may roughly be divided into the following four types.

(1) Configuration in which LC are connected to the primary side of the transformer (2) Configuration in which LC are connected to the secondary side of the transformer (3) Configuration in which L and C are connected to the primary side of the transformer and the secondary side of the transformer, respectively (4) Configuration in which C and L are connected to the primary side of the transformer and the secondary side of the transformer, respectively.

In (1) and (2), the coefficient relating to LC is 1. On the other hand, the coefficient is N2*LC in (3). This is because L on the primary side corresponds to the square of the turns ratio N of the transformer when it is converted to the secondary side. The coefficient is (1/N2)*LC in (4). This is because C of the primary side corresponds to one square of the turns ratio N if it is converted to the secondary side. How to determine the values of the inductor 102 and capacitor 103 is the same as that of the first embodiment. In other words, by determining the peak frequency fe of the alternating voltage Vo first, one combination may be acquired.

The peak frequency fe is set to satisfy the relationship:

$$fe<2*fd$$

where the drive frequency of the vibration member 501 is fd, like the first embodiment.

(First Variation Example of Second Embodiment)

Figure 17B:
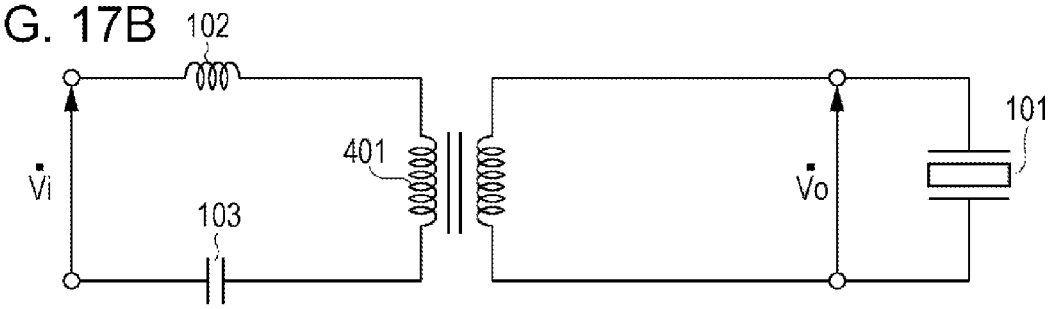

FIG. 17B illustrates a first variation example of the driving circuit for the dust removing device in the second embodiment. In the configuration of the driving circuit, the secondary coil 401b of the transformer 401 is connected to the piezoelectric element 101 in parallel, and the inductor 102 and capacitor 103 are serially connected to the transformer primary coil 401a. Other configurations excluding the one illustrated in FIG. 17B may be implemented if the inductor 102 and the capacitor 103 are serially connected to the transformer primary coil 401a. The inductor 102 may be connected to the primary side of the transformer 401 so that an element with an inductance value as small as $1/N^2$ may be used, compared with the case connected to the secondary side. In this case, N is a turns ratio. The capacitor 103 may be connected to the primary side of the transformer 401 so that an element with a withstand voltage of 1/N may be used, compared with the case connected to the secondary side. The series resonance frequency fs may be expressed by Expression 2-3:

$$fs=1/(2\pi\sqrt{LC}) \quad (2\text{-}3)$$

which is the same as Expression 1-1 where the inductance of the inductor 102 is L and the capacitance of the capacitor 103 is C.

The fs may be substantially matched with the resonance frequency fm of the vibration member 501.

(Second Variation Example of Second Embodiment)

Figure 17C:
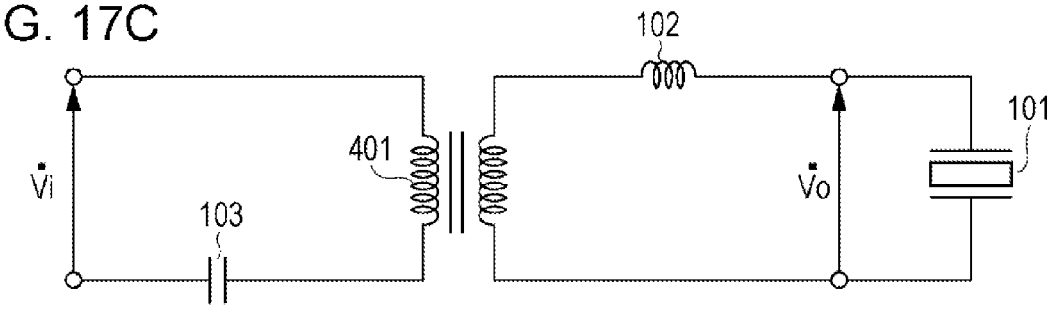

FIG. 17C illustrates a second variation example of the driving circuit for the dust removing device in the second embodiment. In the configuration of the driving circuit, the secondary coil 401b of the transformer 401 is connected to the piezoelectric element 101 in parallel, and the capacitor 103 is serially connected to the transformer primary coil 401a, and the inductor 102 is serially connected to the transformer secondary coil 401b. The inductor 102 may be connected to the secondary side of the transformer 401 so that an element with a current acceptable value as small as 1/N may be used, compared with the case connected to the primary side. In this case, N is a turns ratio. The series resonance frequency fs may be expressed by Expression 2-4:

$$fs=1/(2\pi\sqrt{LC/N^2}) \quad (2\text{-}4)$$

where the inductance of the inductor 102 is L and the capacitance of the capacitor 103 is C.

The fs may be substantially matched with the resonance frequency fm of the vibration member 501.

(Third Variation Example of Second Embodiment)

Figure 17D:
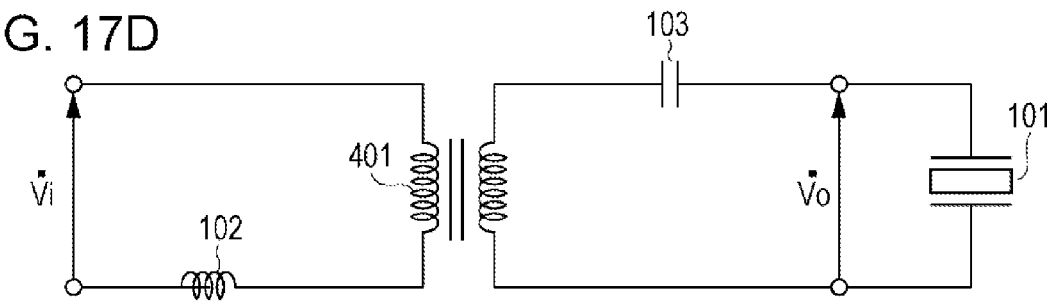

FIG. 17D illustrates a third variation example of the driving circuit for the dust removing device in the second embodiment. In the configuration of the driving circuit, the secondary coil 401b of the transformer 401 is connected to the piezoelectric element 101 in parallel, the inductor 102 is serially connected to the transformer primary coil 401a, and the capacitor 103 is serially connected to the transformer secondary coil 401b. The inductor 102 may be connected to the primary side of the transformer 401 so that an element with an inductance as small as $1/N^2$ may be used, compared with the case connected to the secondary side. The capacitor 103 may be connected to the secondary side of the transformer 401 so that an element with a capacitance of $1/N^2$ may be used, compared with the case connected to the primary side. The series resonance frequency fs in this case may be expressed by Expression 2-5:

$$fs=1/(2\pi\sqrt{LC\cdot N^2}) \quad (2\text{-}5)$$

The fs may be substantially matched with the resonance frequency fm of the vibration member 501.

(Fourth Variation Example of Second Embodiment)

Figure 17E:
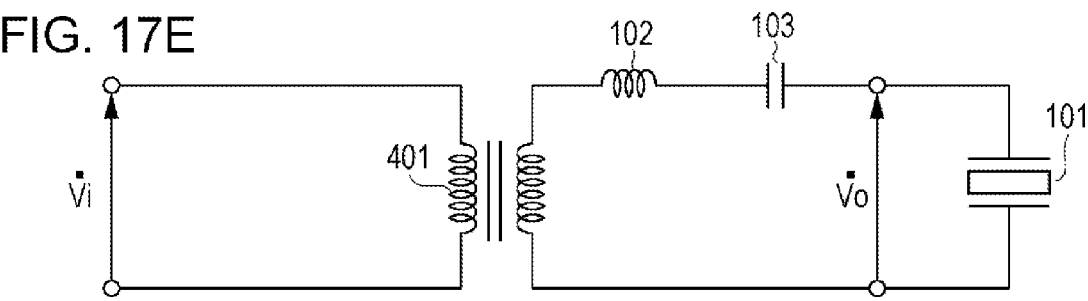

FIG. 17E illustrates a fourth variation example of the driving circuit for the dust removing device in the second embodiment. In the configuration of the driving circuit, the secondary coil 401*b* of the transformer 401 is connected to the piezoelectric element 101 in parallel, and the inductor 102 and capacitor 103 are serially connected to the transformer secondary coil 401*b*. The inductor 102 may be connected to the secondary side of the transformer 401 so that an element with a current acceptable value as small as 1/N may be used, compared with the case connected to the primary side. The capacitor 103 may be connected to the secondary side of the transformer 401 so that an element with a capacitance of $1/N^2$ may be used, compared with the case connected to the primary side. The series resonance frequency fs in this case may be expressed by Expression 2-6:

$$fs=1/(2\pi\sqrt{LC}) \quad (2\text{-}6)$$

The fs may be matched with the resonance frequency fm of the piezoelectric element 101.

Third Embodiment

A third embodiment will be described next. This embodiment is different from the first embodiment in that two vibration mode are alternately excited in the vibration member 501. The configurations of the vibration member 501 and driving circuit are the same as those of the first and second embodiment. The settings of frequency information and phase information in an instruction unit in a control apparatus are different from the first and second embodiment so that the vibrations to be excited may be standing-wave vibrations.
(Standing-Wave Vibrations and Driving Method)

Figure 18A:
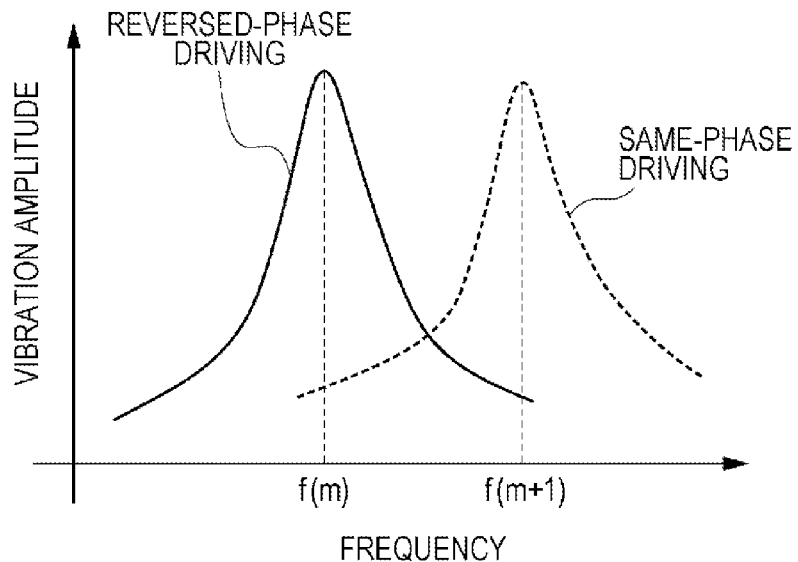
FIGS. 18A and 18B are graphs illustrating frequency of alternating voltages to be applied to a piezoelectric element driven by standing waves, amplitudes of vibrations occurring in the piezoelectric element and voltage waveforms according to a third embodiments.
Figure 18B:
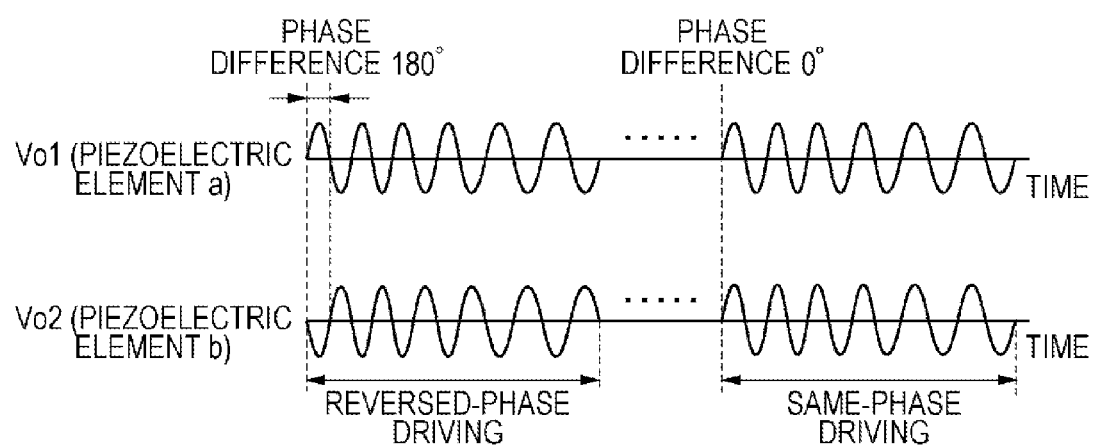

FIG. 18A is a graph illustrating frequency of alternating voltages to be applied to a piezoelectric element and amplitudes of vibrations occurring in the piezoelectric element. In this case, f(m) is a resonance frequency of m-order out-of-plane bending vibrations, and f(m+1) is a resonance frequency of out-of-plane bending vibrations of (m+1)-order. In FIGS. 18A and 18B, f(m) is an order 10 out-of-plane bending vibration mode (first vibration mode) to be excited by opposite phase driving, and f(m+1) is an order 11 out-of-plane bending vibration mode (second vibration mode) to be excited by same phase driving. According to this embodiment, the standing waves of the two vibration modes are alternately excited to remove dust adhered to a surface of an optical member which is an elastic body.

Describing according to the first embodiment with reference to FIG. 7, the order 10 out-of-plane bending vibration is a first vibration mode (waveform A (solid line)), and the order 11 out-of-plane bending vibration is the second vibration mode (waveform B (broken line)) also in this embodiment. The first vibration mode A and second vibration mode B are out-of-plane bending vibration modes which bending deforms the vibration member 501 in the thickness direction of the optical member 502. The deformed shape in the first vibration mode A has opposite phases (with a phase difference of 180°) at left and right ends. On the other hand, the deformed shape in the second vibration mode B is in phase between the left and right ends (with a phase difference of 0°). In other words, if the phase difference between alternating voltages to be applied to the piezoelectric element 101*a* and piezoelectric element 101*b* is set to 180°, the first vibration mode A is only excited under a resonance state. If the phase difference is set to 0° on the other hand, the second vibration mode B is excited.

FIG. 18B illustrates examples of alternating voltages to be applied to piezoelectric elements for alternately exciting two standing-wave vibrations of different orders. The control apparatus may be the one illustrated in FIG. 4. The alternating voltage Vo 1 is a voltage waveform to be applied to the piezoelectric element 101*a*, and the alternating voltage Vo 2 is a voltage waveform to be applied to the piezoelectric element 101*b*. The vertical axis indicates voltage amplitude, and the horizontal axis indicates time.

In order to alternately generate vibrations of the two vibration modes, an alternating voltage having a frequency near the inherent frequency of the order 10 bending vibration mode of the vibration member 501 and having a phase difference of 180° is applied to the piezoelectric elements 101*a* and 101*b* (opposite phase driving). The application of the alternating voltages excites the order 10 bending vibration mode in the vibration member 501. After exciting the order 10 bending vibration mode for a predetermined period of time, an alternating voltage having a frequency near the inherent frequency of the order 11 bending vibration mode of the vibration member 501 and having a phase difference of 0° is applied to the piezoelectric elements 101*a* and 101*b* next (same phase driving). The application of the alternating voltages excites the order 11 bending vibration mode in the vibration member 501.

When the first vibration mode is to be excited but the phase difference between the alternating voltages shifts from 180° within the margin of error due to an influence such as element variations of the driving circuit, the phase difference is regarded as 180° if the first vibration mode vibrations are dominant in the vibrations occurring in the vibration member 501. Similarly, when the second vibration mode is to be excited but the phase difference between the alternating voltages shifts from 0° within the margin of error due to an influence such as element variations of the driving circuit, the phase difference is regarded as 0° if the second vibration mode vibrations are dominant in the vibrations occurring in the vibration member 501.

Repeating this driving (opposite phase driving and same phase driving) my alternately excite vibrations in the order 10 and order 11 out-of-plane bending vibration mode. The alternating voltages Vo 1 and Vo 2 for the driving may sweet gradually from a high frequency side to a low frequency side near the inherent frequency as illustrated in FIG. 18B. The frequency of alternating voltages near the inherent frequency in the vibration member 501 may provide a large amplitude even with small applied voltage, improving the efficiency.

In this way, generating vibrations in the first vibration mode in the vibration member 501 may separate the dust adhered to the optical member 502 at an anti-nodal position of vibrations in the first vibration mode. More specifically, dust is separated from the optical member 502 when vibrations in the first vibration mode apply an acceleration which is equal to or higher than the adhesion of the dust adhered optical member 502 to the dust. Furthermore, generating vibrations in the second vibration mode in the vibration member 501 may separate the dust adhered to the optical member 502 near a node of vibrations in the first vibration mode. Standing waves of different orders are excited to prevent positions without an amplitude in the optical member 502 by causing nodes of the two standing waves at different positions.

The alternating voltages may be applied to only one of the piezoelectric elements 101*a* and 101*b* to excite one standing wave of out-of-plane bending vibrations in the vibration member 501 of a dust removing device. Like this embodiment, when vibrations to be generated in vibration modes of different orders are shifted at intervals in time, the number of piezoelectric elements to be provided in the elastic body is not limited to two as described above but may be one. In this case, the frequencies of alternating voltages to be applied to the piezoelectric elements may be swept to drive, without setting phase differences.

While the embodiments have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-016348 filed Jan. 28, 2011, which is hereby incorporated by reference herein in its entirety.

What is claimed is:

1. A vibration member driving circuit which causes vibrations in a vibration member at least including a first electro-mechanical energy conversion element, a second electro-mechanical energy conversion element, and an elastic body by applying alternating voltage to the first electro-mechanical energy conversion element and the second electro-mechanical energy conversion element fixed to the elastic body, the circuit comprising:

an inductor and a capacitor serially connected to the first electro-mechanical energy conversion element and the second electro-mechanical energy conversion element, wherein $$0.73*fm < fs < 1.2*fm$$

is satisfied where fs is a series resonance frequency by the inductor and the capacitor and fm is a resonance frequency of the vibration member, and wherein alternating voltages having different phases are applied to the first and second electro-mechanical energy conversion elements, respectively, and wherein the alternating voltages have a frequency which generates, in the vibration member, a vibration obtained by superposing a vibration in a first vibration mode and a vibration in a second vibration mode different from the first vibration mode in order.

2. The vibration member driving circuit according to claim 1, wherein fe<2*fd is satisfied where fe is a frequency of a peak voltage of an alternating voltage to be applied to one of the first and second electro-mechanical energy conversion elements and fd is a drive frequency of the vibration member.

3. The vibration member driving circuit according to claim 1, wherein generating vibrations in the vibration member moves powder on the vibration member.

4. The vibration member driving circuit according to claim 3, wherein the powder is dust, and the dust on the vibration member is moved and removed.

5. An optical apparatus comprising the driving circuit according to claim 4, a vibration member to be driven by the driving circuit, and a light receiving element provided at a position where light having passed through the elastic body of the vibration member launches.

6. A vibration member driving circuit which causes vibrations in a vibration member at least including a first electro-mechanical energy conversion element, a second electro-mechanical energy conversion element, and an elastic body by applying alternating voltage to the first electro-mechanical energy conversion element and the second electro-mechanical energy conversion element fixed to the elastic body, the circuit comprising:

a transformer having a primary coil to which alternating voltages are applied and a secondary coil connected in parallel to the first and second electro-mechanical energy conversion elements; and an inductor and capacitor serially connected to the vibration member on at least one of the primary side and secondary side of the transformer, wherein $$0.73*fm < fs < 1.2*fm$$

is satisfied where fs is series resonance frequency by the inductor and the capacitor and fm is a resonance frequency of the vibration member, and wherein alternating voltages having different phases are applied to the first and second electro-mechanical energy conversion elements, respectively, and wherein the alternating voltages have a frequency which generates, in the vibration member, a vibration obtained by superposing a vibration in a first vibration mode and a vibration in a second vibration mode different from the first vibration mode in order.

7. The vibration member driving circuit according to claim 6, wherein the inductor is a leakage inductance of the transformer.

8. The vibration member driving circuit according to claim 6, wherein fe<2*fd is satisfied where fe is a frequency of a peak voltage of an alternating voltage to be applied to one of the first electro-mechanical energy conversion element and the second electro-mechanical energy conversion element and fd is a drive frequency of the vibration member.

9. The vibration member driving circuit according to claim 6, wherein generating vibrations in the vibration member moves powder on the vibration member.

10. The vibration member driving circuit according to claim 6, wherein the powder is dust, and dust on the vibration member is moved and removed.

11. An optical apparatus comprising the driving circuit according to claim 10, a vibration member to be driven by the driving circuit, and a light receiving element provided at a position where light having passed through the elastic body of the vibration member launches.

12. A vibration member driving circuit which causes vibrations in a vibration member at least including a first electro-mechanical energy conversion element, a second electro-mechanical energy conversion element, and an elastic body by applying alternating voltage to the first electro-mechanical energy conversion element and the second electro-mechanical energy conversion element fixed to the elastic body, the circuit comprising:

an inductor and a capacitor serially connected to the first electro-mechanical energy conversion element and the second electro-mechanical energy conversion element, wherein $$0.73*fm < fs < 1.2*fm$$

is satisfied where fs is a series resonance frequency by the inductor and the capacitor and fm is a resonance frequency of the vibration member, wherein a vibration to be generated in a first vibration mode and a vibration in a second vibration mode different from the first vibration mode in order in the vibration member are shifted at time intervals.

13. The vibration member driving circuit according to claim 12, wherein fe<2*fd is satisfied where fe is a frequency of a peak voltage of an alternating voltage to be applied to the one of the first electro-mechanical energy conversion element and the second electro-mechanical energy conversion element and fd is a drive frequency of the vibration member.

14. The vibration member driving circuit according to claim 12, wherein generating vibrations in the vibration member moves powder on the vibration member.

15. The vibration member driving circuit according to claim 14, wherein the powder is dust, and the dust on the vibration member is moved and removed.

16. An optical apparatus comprising the driving circuit according to claim 15, a vibration member to be driven by the driving circuit, and a light receiving element provided at a position where light having passed through the elastic body of the vibration member launches.

17. A vibration member driving circuit which causes vibrations in a vibration member at least including a first electro-mechanical energy conversion element, a second electro-mechanical energy conversion element, and an elastic body by applying alternating voltage to the first electro-mechanical energy conversion element and the second electro-mechanical energy conversion element fixed to the elastic body, the circuit comprising:
  a transformer having a primary coil to which alternating voltages are applied and a secondary coil connected in parallel to the first and second electro-mechanical energy conversion elements; and
  an inductor and capacitor serially connected to the first and second electro-mechanical energy conversion elements on at least one of the primary side and secondary side of the transformer, wherein $0.73*fm < fs < 1.2*fm$ is satisfied where fs is series resonance frequency by the inductor and the capacitor and fm is a resonance frequency of the vibration member, wherein a vibration to be generated in a first vibration mode and a vibration in a second vibration mode different from the first vibration mode in order in the vibration member are shifted at time intervals.

18. The vibration member driving circuit according to claim 17, wherein the inductor is a leakage inductance of the transformer.

19. The vibration member driving circuit according to claim 17, wherein fe<2*fd is satisfied where fe is a frequency of a peak voltage of an alternating voltage to be applied to one of the first electro-mechanical energy conversion element and the second electro-mechanical energy conversion element and fd is a drive frequency of the vibration member.

20. The vibration member driving circuit according to claim 17, wherein generating vibrations in the vibration member moves powder on the vibration member.

21. The vibration member driving circuit according to claim 17, wherein the powder is dust, and dust on the vibration member is moved and removed.

22. An optical apparatus comprising the driving circuit according to claim 21, a vibration member to be driven by the driving circuit, and a light receiving element provided at a position where light having passed through the elastic body of the vibration member launches.

* * * * *